US011296477B2

(12) United States Patent
Beresnev et al.

(10) Patent No.: US 11,296,477 B2
(45) Date of Patent: Apr. 5, 2022

(54) SYSTEMS, APPARATUSES AND METHODS FOR COHERENT BEAM COMBINING OF FIBER LASER BEAMS WITH BROADENED LINEWIDTH

(71) Applicant: U.S. Army Research Laboratory, Adelphi, MD (US)

(72) Inventors: Leonid A. Beresnev, Dayton, MD (US); Kristan P. Gurton, Olney, MD (US); David A. Ligon, Columbia, MD (US); Anthony R. Valenzuela, Baltimore, MD (US); Chatt C. Williamson, Mt. Airy, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 530 days.

(21) Appl. No.: 16/400,096

(22) Filed: May 1, 2019

(65) Prior Publication Data

US 2020/0350737 A1 Nov. 5, 2020

(51) Int. Cl.
*H01S 3/00* (2006.01)
*G02B 27/10* (2006.01)
(Continued)

(52) U.S. Cl.
CPC ........ *H01S 3/0085* (2013.01); *G02B 27/0905* (2013.01); *G02B 27/0927* (2013.01); *G02B 27/0961* (2013.01); *G02B 27/0994* (2013.01); *G02B 27/1006* (2013.01); *H01S 3/0071* (2013.01); *H01S 3/067* (2013.01);
(Continued)

(58) Field of Classification Search
CPC ...... H01S 3/0071; H01S 3/067; H01S 3/2383; H01S 3/1003; H01S 3/1305; H01S 3/1301; H01S 3/1307; H01S 3/06754; H01S 3/0085; G02B 27/0927; G02B 27/1006; G02B 27/0905; G02B 27/0961; G02B 27/0994
See application file for complete search history.

(56) References Cited

U.S. PATENT DOCUMENTS 5,946,130 A * 8/1999 Rice .................... G02B 6/4249
359/349
8,520,306 B2 * 8/2013 Varnham ............. H01S 3/06758
359/618

(Continued)

*Primary Examiner* — M. A. Golub-Miller
(74) *Attorney, Agent, or Firm* — Alan I. Kalb

(57) ABSTRACT

A method, apparatus and system for coherent beam combining (CBC) in high energy fiber laser (HEL) systems include generating a reference interference pattern of a signal source including at least two single-mode optical signals, capturing and evaluating the reference interference pattern, maximizing an intensity of the selected area of the captured, reference interference pattern, increasing a linewidth of the optical signals generating the reference interference pattern until the reference interference pattern is degraded, and adjusting a delay time of one of the at least two single-mode optical signals until the reference interference pattern is recovered, by adjusting a value of a delay of a delayed RF signal with a broaden linewidth to a respective EO linewidth broadening modulator in at least one channel of the at least two single-mode optical signals while evaluating the interference pattern on a display device.

12 Claims, 18 Drawing Sheets

(51) Int. Cl.
*G02B 27/09* (2006.01)
*H01S 3/067* (2006.01)
*H01S 3/13* (2006.01)
*H01S 3/23* (2006.01)
*H01S 3/10* (2006.01)

(52) U.S. Cl.
CPC .......... *H01S 3/1301* (2013.01); *H01S 3/1307* (2013.01); *H01S 3/2383* (2013.01); *H01S 3/06754* (2013.01); *H01S 3/1003* (2013.01); *H01S 3/1305* (2013.01)

(56) References Cited

U.S. PATENT DOCUMENTS

| | | | |
|---|---|---|---|
| 8,526,110 B1* | 9/2013 | Honea | H01S 3/06791 359/556 |
| 2009/0296751 A1* | 12/2009 | Kewitsch | H01S 5/042 372/18 |
| 2011/0032602 A1* | 2/2011 | Rothenberg | H01S 3/2383 359/341.1 |
| 2011/0243164 A1* | 10/2011 | Messerly | H01S 3/2383 372/28 |
| 2011/0280581 A1* | 11/2011 | Chann | G02B 6/2931 398/98 |
| 2013/0342895 A1* | 12/2013 | Chann | H01S 3/1307 359/338 |
| 2018/0275418 A1* | 9/2018 | Beresnev | F41H 13/0062 |
| 2019/0305504 A1* | 10/2019 | Goodno | H01S 3/10015 |
| 2021/0021095 A1* | 1/2021 | Di Teodoro | G02B 27/1086 |
| 2021/0103152 A1* | 4/2021 | Goodno | H01S 3/1618 |
| 2021/0103155 A1* | 4/2021 | Goodno | H01S 3/005 |
| 2021/0135421 A1* | 5/2021 | Davis | G01N 21/59 |
| 2021/0351559 A1* | 11/2021 | Langseth | H01S 3/1307 |

\* cited by examiner

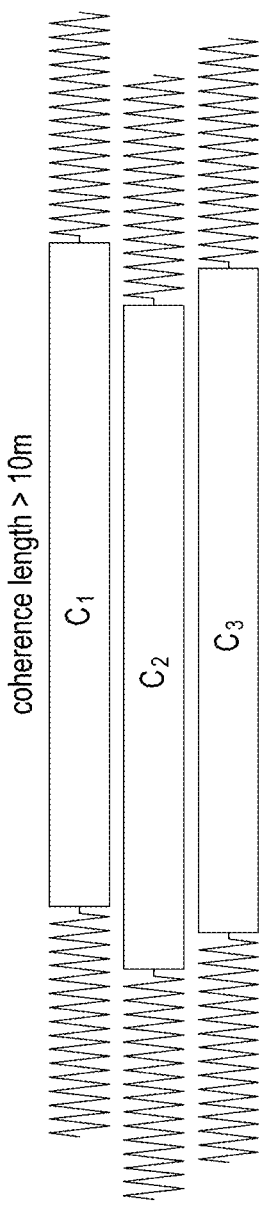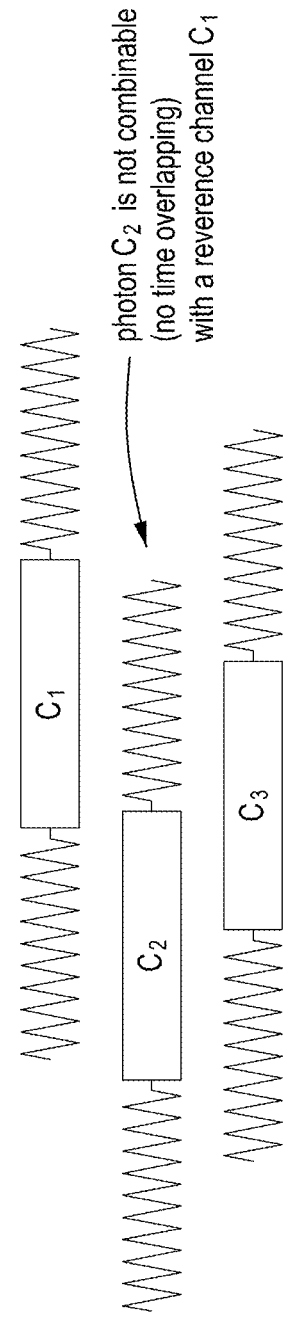

CONTINUE FROM FIG 6A

600

- 611 — THE DELAY TIME OF THE CHANNEL USED TO RECOVER THE INTERFERENCE PATTERN IS SET TO A HALF POINT BETWEEN THE RECOVERY OF THE INTERFERENCE PATTERN WITH RESPECT TO A REFERENCE CHANNEL AND A DEGRADATION OF THE INTERFERENCE PATTERN WHEN EVALUATED WITH RESPECT TO A CHANNEL NOT USED TO RECOVER THE INTERFERENCE PATTERN

- 612 — A LINEWIDTH OF THE RADIATION SIGNAL FROM THE SIGNAL SOURCE IS AGAIN INCREASED WHILE OBSERVING THE IMAGE OF THE CAPTURED INTERFERENCE PATTERN UNTIL AN IMAGE OF THE INTERFERENCE PATTERN IS DEGRADED

- 614 — A DELAY TIME OF SECOND CHANNEL OF THE CHANNELS OF THE MULTI-CHANNEL LASER SYSTEM IS ADJUSTED UNTIL THE IMAGE OF THE CAPTURED INTERFERENCE PATTERN IS AGAIN RECOVERED

- 615 — THE DELAY TIME OF THE CHANNEL USED TO AGAIN RECOVER THE INTERFERENCE PATTERN IS SET TO A HALF POINT BETWEEN THE RECOVERY OF THE INTERFERENCE PATTERN WITH RESPECT TO A REFERENCE CHANNEL AND A DEGRADATION OF THE INTERFERENCE PATTERN WHEN EVALUATED WITH RESPECT TO A CHANNEL NOT USED TO RECOVER THE INTERFERENCE PATTERN

- 616 — REPEAT 612-615 UNTIL THE LINEWIDTH OF THE RADIATION SIGNAL IS BROADENED TO A LEVEL OF SBS-FREE OPERATION IN AT LEAST TWO NEIGHBORING CHANNELS AND THE CHANNELS ARE ALIGNED

- 617 — A CHANNEL OF THE ALIGNED/MATCHED CHANNELS IS SELECTED AS A REFERENCE TO ALIGN UN-ALIGNED NEIGHBORING CHANNELS

- 618 — REPEAT 604-617 UNTIL THE LINEWIDTH OF THE RADIATION SIGNAL IS BROADENED TO A LEVEL OF SBS-FREE OPERATION IN ALL CHANNELS AND ALL CHANNELS ARE ALIGNED

END

FIG. 6B

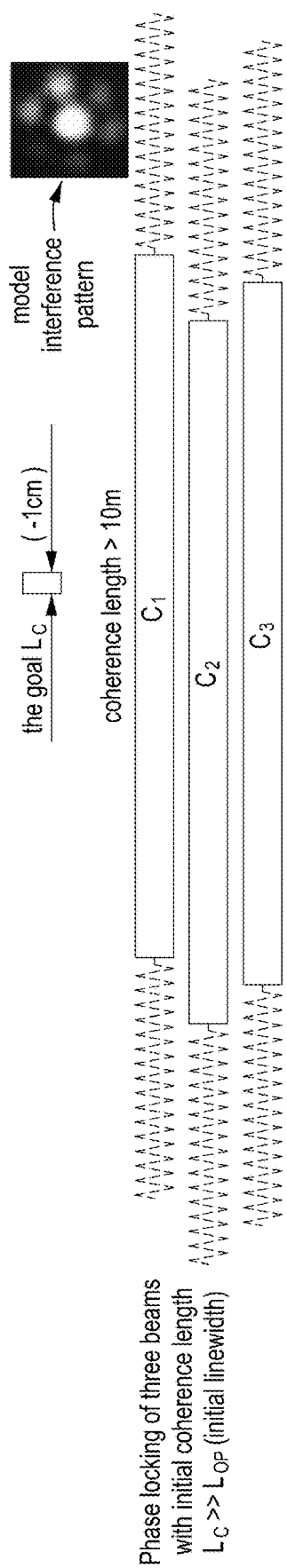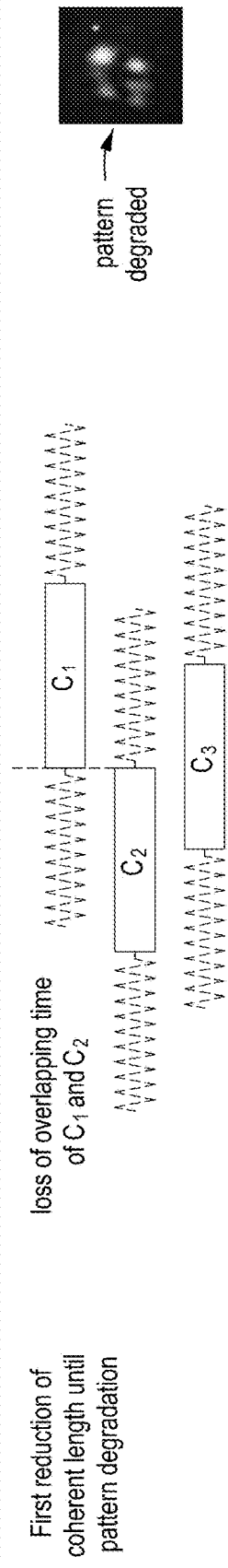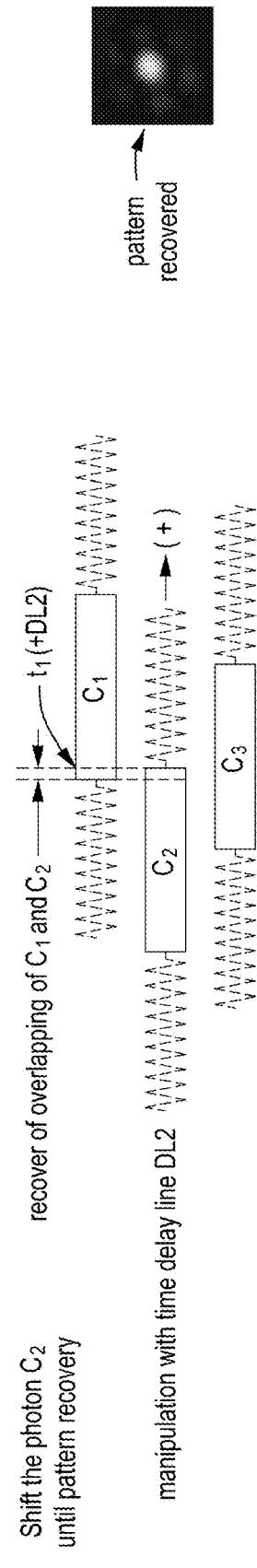
FIG. 9A
FIG. 9B
FIG. 9C

Continue to shift the photon $C_2$
until pattern degradation
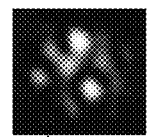
pattern degraded
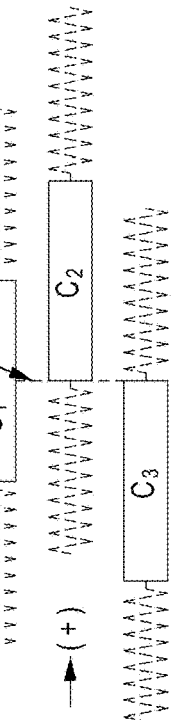
$t_2(+DL2)$
loss of overlapping of $C_2$ and $C_3$
FIG. 9D
Set $C_2$ between $C_1$ and $C_3$
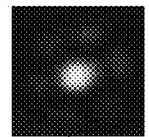
pattern recovered
the goal
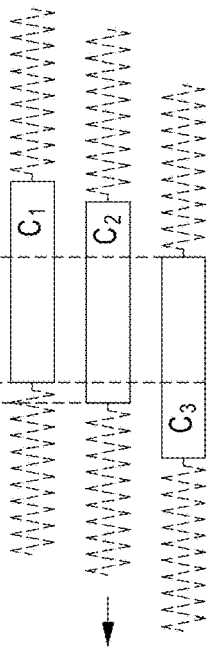
$t_{mid}(DL2)$
reliable overlapping
of all three photons
$C_1$, $C_2$ and $C_3$
(the goal) $L_C \sim 1cm$
FIG. 9E

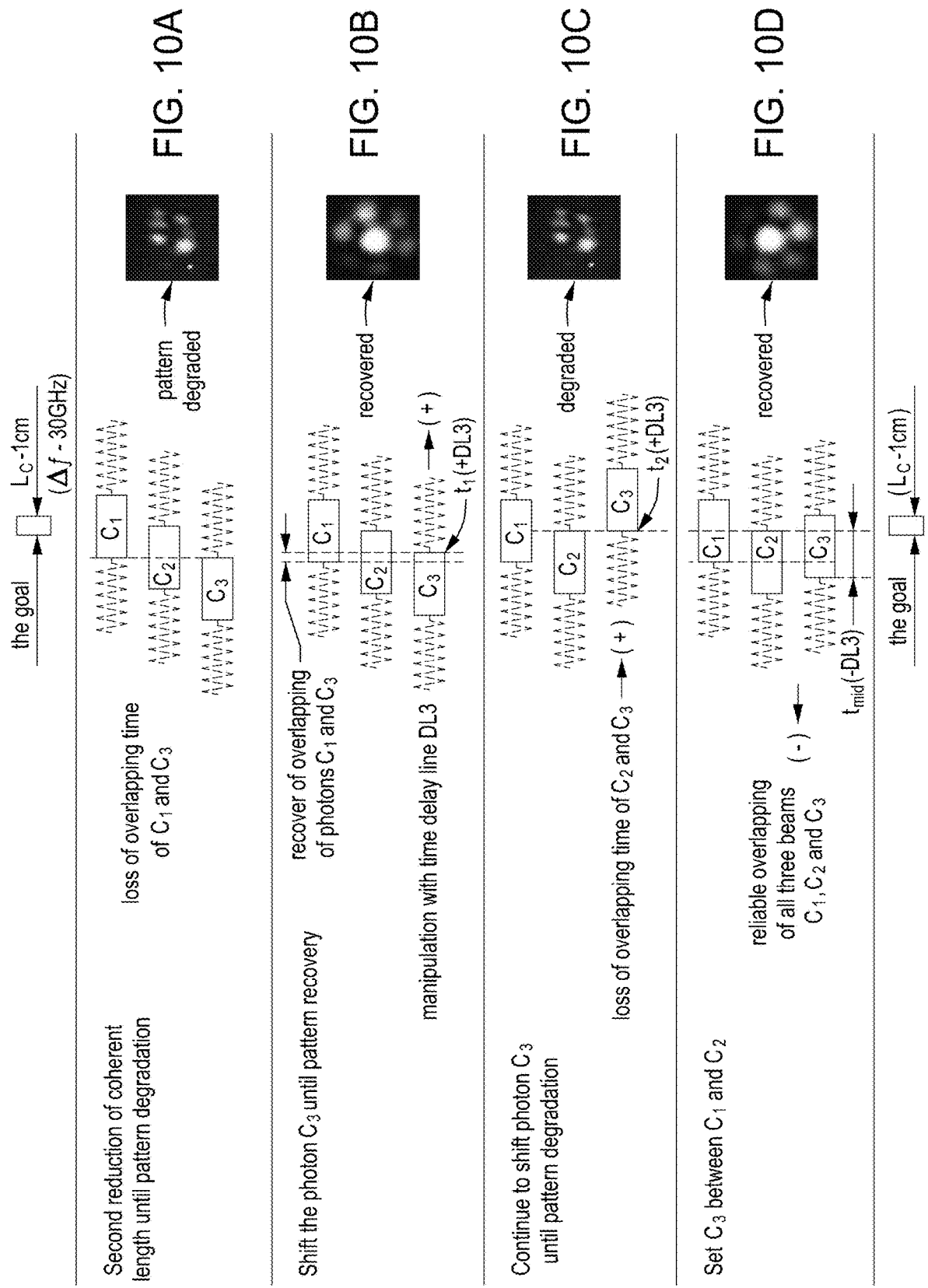

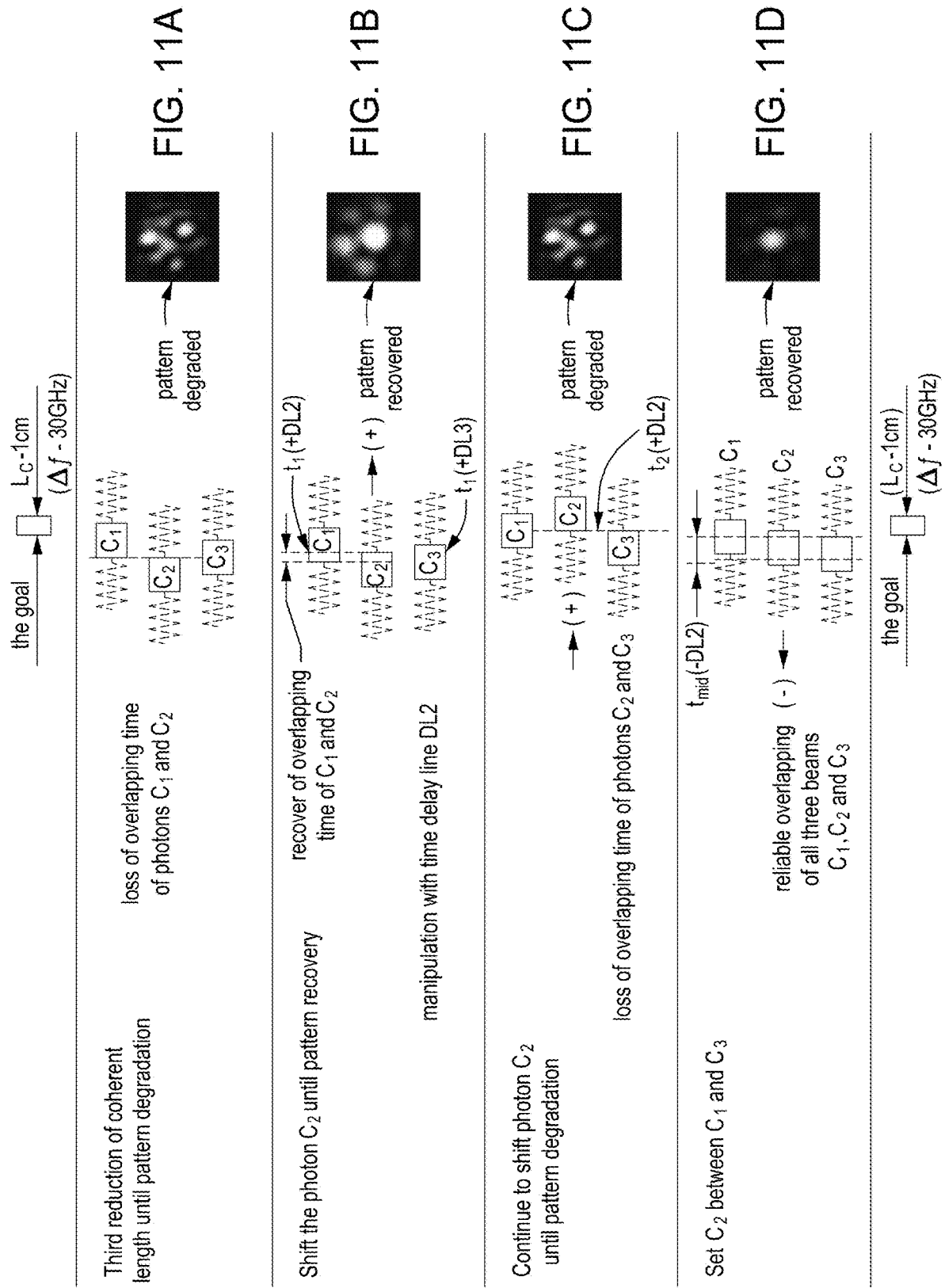

SYSTEMS, APPARATUSES AND METHODS FOR COHERENT BEAM COMBINING OF FIBER LASER BEAMS WITH BROADENED LINEWIDTH

FIELD

Embodiments of the present principles generally relate to coherent beam combining (CBC) and more specifically to methods, apparatuses and systems for coherent beam combining (CBC) in high energy fiber laser (HEL) systems.

BACKGROUND

For CBC in which the fiber laser channels that are to be combined are of low to moderate optical powers (e.g., from milli-Watts to a few hundred Watts), the associated linewidths for such fiber lasers are considered fairly narrow in extent. For example, typical line-widths for low to moderate power fiber lasers are on the order of kHz-MHz range. As a result, the length of coherence photons emitted from each fiber laser may be on the order of tens of meters or more. For fiber laser systems with such long coherence lengths, coherently combining two or more such lasers is a relatively easy task since all that is needed to effectively phase-match the laser beams is that their respective coherent lengths overlap to some degree as depicted in FIG. 1, where coherent lengths $C_1$, $C_2$ and $C_3$, all overlap.

However for high energy laser (HEL) systems, the ability to implement CBC becomes significantly more difficult and technically challenging. A primary difficulty for implementing CBC arises for high power applications because one must artificially "broaden" the source laser's line width in order to avoid detrimental non-linear effects (e.g., Stimulated Brillouin Scattering (SBS)) that can severely limit the amount of energy that can propagate through the fiber laser media. As a direct result of broadening the laser linewidth, the coherence lengths for each fiber laser is reduced proportionately. As a result, coherence lengths are reduced to lengths on the order of centimeters or millimeters. For example, FIG. 2 depicts resultant coherence lengths for three fiber lasers in which the laser linewidths are broadened in order to propagate high optical power densities through a given fiber while avoiding SBS, which in turn reduces the coherence length for each fiber laser. As depicted in FIG. 2, coherence length $C_1$ overlaps with $C_3$, but not with $C_2$. Conversely, coherence length $C_2$ overlaps with $C_3$, but not with $C_1$. FIG. 2 depicts the difficulty that arises in combining multiple fiber laser beams when the coherence lengths become exceeding small, and mismatches between laser beam coherences can arise.

SUMMARY

Embodiments of methods, apparatuses and systems for coherent beam combining (CBC) in high energy fiber laser (HEL) systems are disclosed herein.

In some embodiments, in a high energy fiber laser system including a first sub-system comprising a first optical beam splitter for splitting an optical source signal (master signal) into at least two channels of the first sub-system, each of the at least two channels of the first sub-system comprising a first electro-optical (EO) modulator, a second EO modulator, an amplifier, and output optics, the output optics including a fiber facet, a collimating lens, a focusing lens common to all of the at least two channels of the first sub-system, and an optical signal capture device, a display device and a second sub-system comprising a linewidth broadening radio-frequency (RF) generator, a second (RF) splitter for splitting an RF broadening signal into at least two channels of the second sub-system, each of the at least two channels of the second sub-system comprising a delay line, a method for coherent beam combining includes generating a reference interference pattern by propagating the master optical signal through the first sub-system, the signal source including at least two single-mode optical signals, capturing and evaluating the reference interference pattern using the optical signal capture device and the display device, maximizing an intensity of the captured, reference interference pattern by phase locking optical signals in the at least two channels of the first sub-system using the second EO modulators in the at least two channels of the first sub-system, increasing a linewidth of the optical signals in the at least two channels of the first sub-system until the reference interference pattern is degraded by applying a radio frequency broadening signal from the linewidth RF generator to the first EO modulators in the at least two channels of the first sub-system while evaluating the reference interference pattern on the display device, and adjusting a delay time of a respective delay line of one of the at least two optical channels of the first sub-system until the reference interference pattern is recovered, by adjusting a value of a delay in one of the delay lines of the at least two channels of the second sub-system and applying a resulting delay RF signal to a respective one of the first EO modulators in the at least two channels of the first sub-system while evaluating the interference pattern on the display device.

In some embodiments, the above described method can further include increasing a linewidth of the optical signals in the at least two channels of the first sub-system until the reference interference pattern is degraded by applying an RF broadening signal from the linewidth RF generator to the first EO modulators in the at least two channels of the first sub-system while evaluating the reference interference pattern on the display device, and adjusting a delay time of another one of the at least two channels of the first sub-system until the reference interference pattern is recovered, by adjusting a value of a delay in one of the RF delay lines of another one of the at least two channels of the second sub-system and applying a resulting delay signal to a respective one of the modulators in the at least two channels of the first sub-system while evaluating the interference pattern on the display device.

In some embodiments, a system controller for coherent beam combining (CBC) in high energy laser (HEL) systems includes a processor and a memory coupled to the processor, the memory having stored therein at least one of programs or instructions executable by the processor to configure the system controller to generate a reference interference pattern of a signal source including at least two single-mode optical signals, capturing and evaluate the reference interference pattern, maximize an intensity of the selected area of the captured, reference interference pattern, increase a linewidth of the optical signals which generate the reference interference pattern until the reference interference pattern is degraded, and adjust a delay time of one of the at least two single-mode optical signals until the reference interference pattern is recovered, by adjusting a value of a delay time of a delayed RF signal applied to a respective first EO modulator in at least one channel of the at least two single-mode optical signals while evaluating the interference pattern on a display device In some embodiments, a system for coherent beam combining includes a signal source providing at least two single mode optical signals, a first sub-system, including a first fiber optic beam splitter splitting a signal received from the signal source (master signal) into at least two channels, where each of the at least two fiber optic channels include, a first optical modulator modulating a respective, split optical signal, a second optical modulator phase locking optical signals received from a respective first optical modulator, an optical amplifier amplifying optical signals received from a respective second optical modulator, a fiber facet outputting optical signals received from a respective optical amplifier, output optics focusing optical signals received from the fiber facets to a focal plane to generate a reference interference pattern, an optical signal capture device capturing the reference interference pattern, and a display device displaying at least the captured reference interference pattern. In such embodiments, the system further includes a second sub-system, including a linewidth broadening RF generator providing radio frequency broadening signals, a second electronic splitter for splitting the radio frequency broadening signal into at least two channels of the second sub-system, where each of the at least two channels of the second sub-system include a RF delay line, and the system further includes a system controller, receiving signal from at least one of the optical signal capture device (metric signal) and the display device, the system controller including a processor and a memory coupled to the processor. In such embodiments, the system controller is configured to evaluate the reference interference pattern using the signals received from at least one of the optical signal capture device (metric) and the display device, maximize an intensity of the reference interference pattern by causing a phase locking of optical signals in the at least two channels of the first sub-system using the second EO modulators in the at least two fiber optic channels of the first sub-system, increase a linewidth of the optical signals in the at least two channels of the first sub-system until the reference interference pattern is degraded by causing the application of a radio frequency broadening signal from the linewidth RF generator to the first EO modulators in the at least two channels of the first sub-system while evaluating the reference interference pattern on the display device by using the signal (metric) received from the at least one of the optical signal capture device and the display device, and adjust a delay time of a respective delay line of one of the at least two channels of the first sub-system until the reference interference pattern is recovered, by causing an adjustment of a value of a delay in one of the delay lines of the at least two channels of the second sub-system and causing the application of a resulting delay signal to a respective one of the modulators in the at least two channels of the first sub-system while evaluating the interference pattern by using the signal (metric) received from the at least one of the optical signal capture device and the display device.

In such embodiments of a system for coherent beam combining, a system controller can further be configured to increase a linewidth of the optical signals in the at least two channels of the first sub-system until the reference interference pattern is degraded by causing the application of an RF broadening signal from the linewidth RF generator to the EO modulators in the at least two channels of the first sub-system while evaluating the reference interference pattern on the display device, and adjust a delay time of another one of the at least two channels of the first sub-system until the reference interference pattern is recovered, by causing the adjustment of a value of a delay in one of the delay lines of another one of the at least two channels of the second sub-system and by causing the application of a resulting delay signal to a respective one of the EO modulators in the at least two fiber optic channels of the first sub-system while evaluating the interference pattern by using the signals received from the at least one of the optical signal capture device and the display device.

Other and further embodiments of the present principles are described below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the present principles and are therefore not to be considered limiting of scope, for the present principles may admit to other equally effective embodiments.

FIG. 1 depicts an overlapping of a three laser photons $C_1$, $C_2$, $C_3$ having very long, respective coherence lengths.

FIG. 2 depicts resultant coherence lengths for three lasers in which the laser linewidths are broadened in order to propagate high optical power densities through a given fiber.

FIG. 6B depicts a flow diagram of a method 600 for coherent beam combining (CBC) of multiple channels in high energy laser (HEL) systems in accordance with an embodiment of the present principles

FIG. 9A depicts a graphical representation of phase locking of three beams with a long initial coherence length in accordance with an embodiment of the present principles.

FIG. 9B depicts a graphical representation of a first reduction of a coherence length of the three beams until a degradation of the interference pattern in accordance with an embodiment of the present principles.

FIG. 9C depicts a graphical representation of a shift of a photon in a first channel until a recovery of the interference pattern in accordance with an embodiment of the present principles.

FIG. 9D depicts a graphical representation of a shift of the photon to the edge of the recovery of the interference pattern in accordance with an embodiment of the present principles.

FIG. 9E depicts a graphical representation of a shift of the photon to a middle point in accordance with an embodiment of the present principles.

FIG. 10A depicts a graphical representation of a second reduction of a coherence length of the three beams until a degradation of the interference pattern in accordance with an embodiment of the present principles.

FIG. 10B depicts a graphical representation of a shift of a photon in a second channel until a recovery of the interference pattern in accordance with an embodiment of the present principles.

FIG. 10C depicts a graphical representation of a shift of the photon to the edge of the recovery of the interference pattern in accordance with an embodiment of the present principles.

FIG. 10D depicts a graphical representation of a shift of the photon to a middle point in accordance with an embodiment of the present principles.

FIG. 11A depicts a graphical representation of a third reduction of a coherence length of the three beams until a degradation of the interference pattern in accordance with an embodiment of the present principles.

FIG. 11B depicts a graphical representation of a shift of a photon in the second channel again until a recovery of the interference pattern in accordance with an embodiment of the present principles.

FIG. 11C depicts a graphical representation of a shift of the photon to the edge of the recovery of the interference pattern in accordance with an embodiment of the present principles.

FIG. 11D depicts a graphical representation of a shift of the photon to a middle point in accordance with an embodiment of the present principles.

Figure 3:
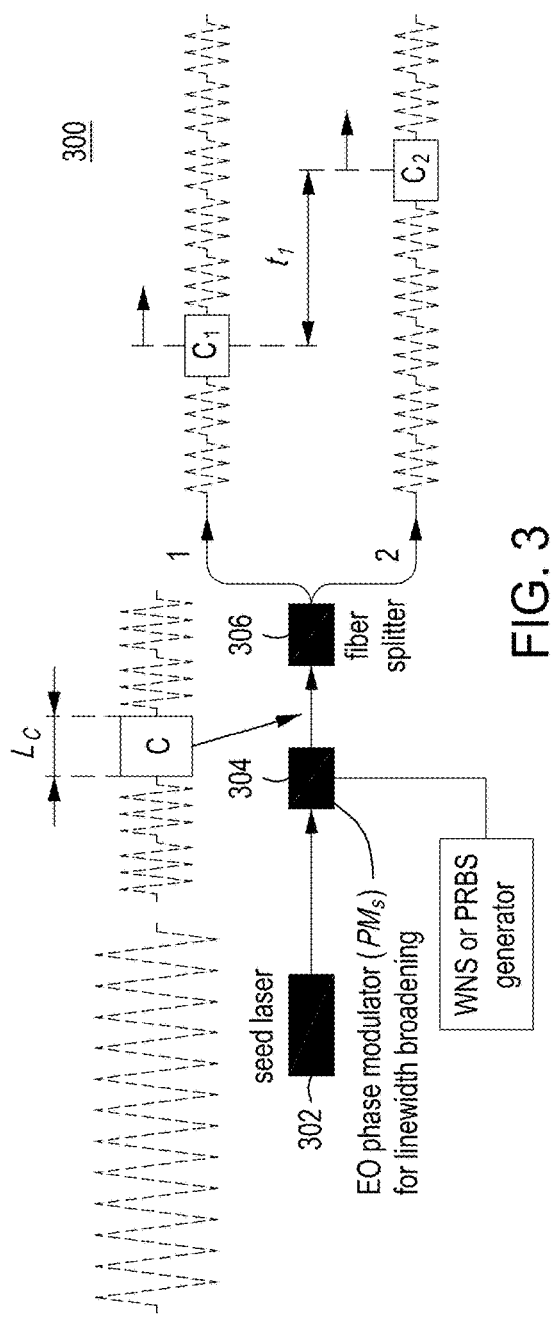
FIG. 3 depicts a high level block diagram of a system for broadening laser line widths.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

In the following description, numerous specific details are set forth in order to provide a thorough understanding of exemplary embodiments or other examples described herein. However, these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed. For example, although embodiments of the present principles are described with respect to specific optical devices, such as collimators, lenses, and laser devices and with reference to a specific number of channels, other specific hardware and software, other hardware devices and software means capable of producing, focusing, and directing light in various other numbers of channels can be implemented in accordance with various embodiments of the present principles.

Embodiments in accordance with the present principles provide methods, apparatuses and systems for coherent beam combining (CBC) in high energy laser (HEL) systems.

Fiber lasers are considered the most advanced laser sources because of the very high wall-plug efficiency, reaching 40%, and almost ideal beam quality, $M^2<1.1$, allowing for beam focusing at, or near, the diffraction limited spot. However, increasing the power of a fiber laser while maintaining high beam quality, is often limited by non-linear effects (e.g., Stimulated Brillouin Scattering (SBS)) in single-mode fibers. Conversely, the use of multi-mode fibers to increase radiated power above 10 kW leads to loss of beam quality and to the necessity of increasing the size of the focusing mirrors and the addition of adaptive optics resulting in increased size, weight, and power (SWaP) required for a laser.

One of the more practical methods for achieving 100 kW laser power or above is to combine multiple fiber lasers, each with modest power and high beam quality. For example, a 50 kW system can be theoretically generated by combining, for example, 25-30 individual fiber lasers each with a power≈1-2 kW.

Coherent beam combining (CBC) using a conformal array of fiber laser collimators is a good approach for small, compact, mobile, fiber laser applications because of the simplicity of the system. An array of collimators (each powered by a kW type fiber laser) can be closely packed and designed so that no external cooling is required. In addition, fiber collimators can incorporate piezo-electric actuators that allow for rapid tip/tilt operation for each outgoing beam. When coupled with feedback information, these highly adaptive beam directors can compensate for aberrations induced by propagation through the atmosphere and correct for optical turbulence effects.

However, for achieving CBC for N number of "high" power (single mode) fiber lasers, the laser linewidth in each fiber amplifier should be significantly broadened to avoid various non-linear effects, (e.g., Stimulated Brillouin Scattering (SBS). The line broadening, however, produces an effective coherence length, $L_c$, that is significantly smaller than in low power applications.

A common approach used to broaden laser line widths is to quickly (GHz) modulate the phase of fiber radiation. In some applications, an electro-optical phase modulator is placed at low power points in the optical path, typically after a seed laser and before a high power fiber laser amplifier(s). The modulating signal usually takes the form of either a white noise signal (WNS) or by using fast frequency chirping or a pseudo-random bit sequence (PRBS). FIG. 3 depicts a high level block diagram of a system 300 for broadening laser line widths. The system 300 of FIG. 3 illustratively comprises a seed laser 302, a phase modulator 304 and a fiber splitter 306. In the system 300 of FIG. 3, a coherence length of a laser signal from the seed laser is reduced by the broadening of the laser signal with the modulator 304, which illustratively comprises a white noise signal (WNS) and/or a pseudo-random bit sequence signal (PRBS). As depicted in FIG. 3, the fiber splitter 306 splits the modulated laser signal into, illustratively, two separate signals traveling along separate, respective paths, 1 and 2, and resulting photons, $C_1$ and $C_2$, are separated by a time delay, $t_1$.

In systems in which laser line widths are broadened, such as the system 300 of FIG. 3, for high power laser signals exceeding 1 kW per channel, the linewidth of fiber output due to broadening can become as large as 15-20 GHz, with a drastic decrease of coherence length, $L_c$, to ~10-15 mm. Such small $L_c$ can make the beams coherently "non-combinable" due to the fact that the photons $C_1$ and $C_2$ shown in the system 300 of FIG. 3 can arrive at a destination plane (target or output lenses) with a time separation of greater than 1 nano-second, $t_1 > 1$ nsec. The nano-second difference between arrival times of coherent photons $C_1$ and $C_2$ at a target is much longer than current phase-locking modulators can provide (i.e., a fast modulator typically has the dynamical range of phase shifts of less than hundreds of wavelengths, or time shift of less than 1 ps).

Another detrimental time delay that can exist between photons $C_1$ and $C_2$ in channels 1 and 2 in systems in which laser line widths are broadened, such as the system 300 of FIG. 3, can result from optical path differences that can be on the order of ±0.5 m and that exist between fiber amplifiers in channels 1 and 2 due to uncertainties in the fiber-cut lengths within the manufacturing process. Such a difference in path length can result in a further delay between photons in different channels, such as channels 1 and 2. In such systems, a time delay can be as large as 2 ns. Such a delay results in a further deterioration of the coherent beam combining of laser signals.

Figure 4:
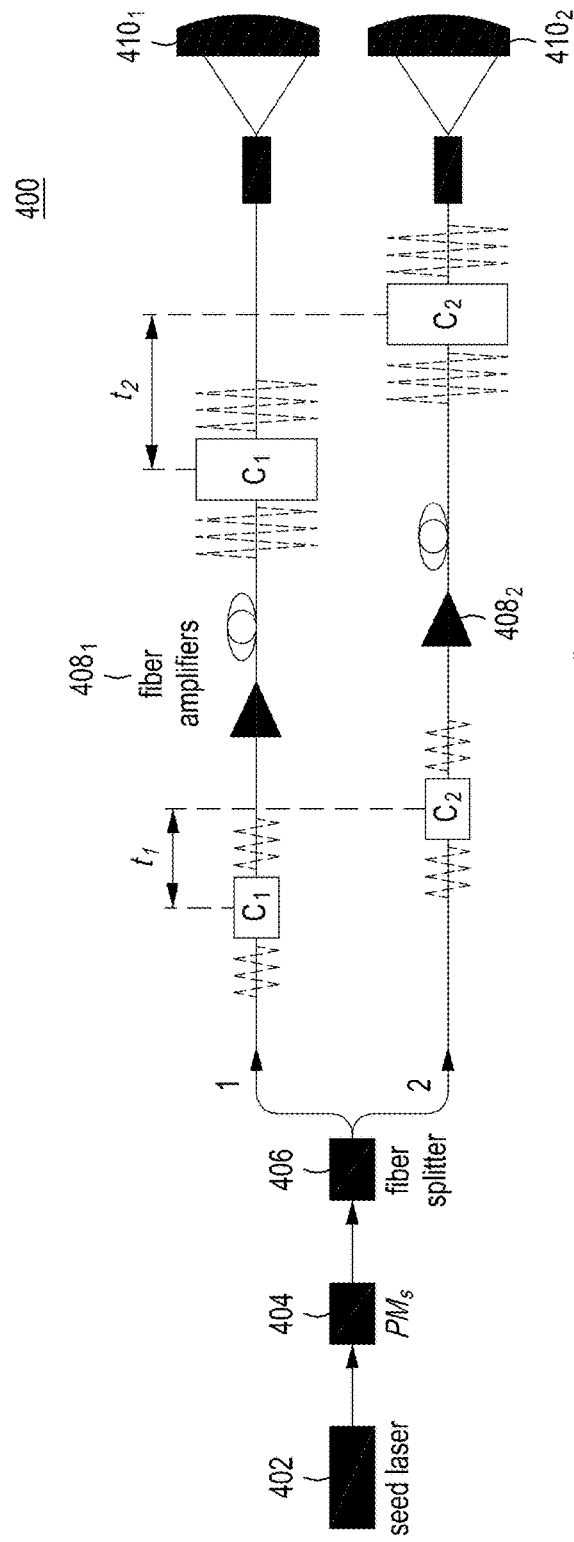
FIG. 4 depicts a high level block diagram of a system for beam combining.

FIG. 4 depicts a high level block diagram of a system 400 for beam combining in which laser line widths are broadened such as the broadening in the system 300 of FIG. 3. The system 400 of FIG. 4 illustratively comprises a seed laser 402, a phase modulator 404, a fiber splitter 406, two fiber amplifiers $408_1$ and $408_2$, and two lenses $410_1$ and $410_2$. In the system 400 of FIG. 4, a laser signal from the seed laser 402 is broadened by the phase modulator 404. The broadened laser signal is split by the fiber splitter 406 into, illustratively, two channels, 1 and 2. The photon $C_1$ in channel 1 and the photon $C_2$ in channel 2 incur a time delay, $t_1$, due to the broadening of the laser signal by the phase modulator, 404. The laser signal in channel 1 is amplified by fiber amplifier $408_1$ and the laser signal in channel 2 is amplified by fiber amplifier $408_2$. As depicted in FIG. 4 and previously described above, the photon $C_1$ in channel 1 and the photon $C_2$ in channel 2 incur a second time delay, $t_2$, due to uncertainties in the fiber-cut lengths between fiber amplifiers $408_1$ and $408_2$. In the system 400 of FIG. 4, after being amplified the photon $C_1$ in channel 1 and the photon $C_2$ in channel 2 propagate along channel 1 and channel 2, respectively to the output lens.

The inventors propose herein systems and methods for synchronizing an arrival time of coherent photons, $C_1$ to $C_N$, to output lenses for multiple channels in which photons propagate through a set of optical paths including high-power fiber amplifiers. In accordance with several embodiments of the present principles, extremely high accuracy optical path matching can be achieved by evaluating an interference pattern characterizing the arrival of photons at the output optics of a multi-channel transmitter transmitting coherently combined photons to a remote target.

Figure 5:
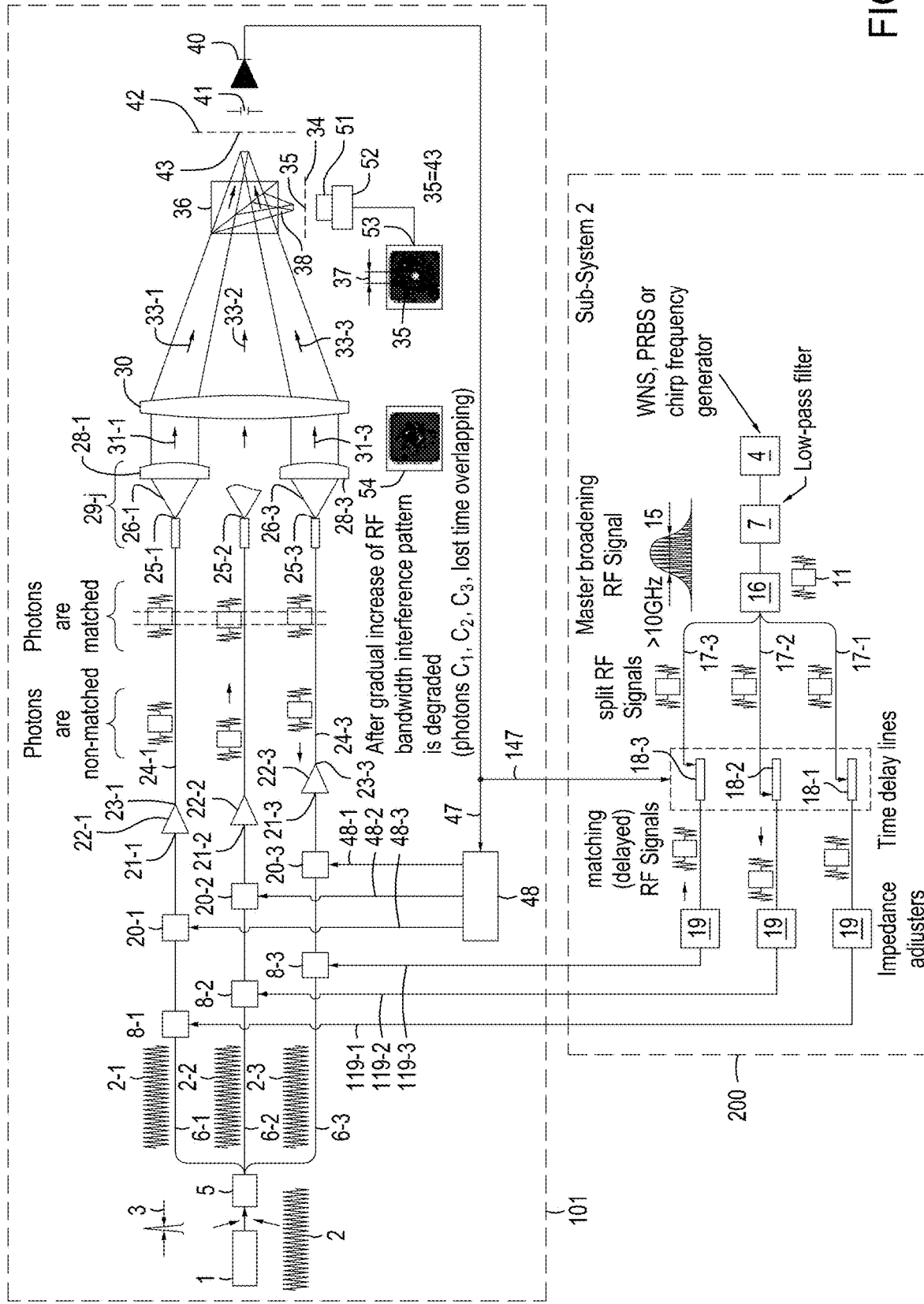
FIG. 5 depicts a high level block diagram of a coherent beam combining system in accordance with an embodiment of the present principles.

FIG. 5 depicts a high level block diagram of a coherent beam combining system 500 in accordance with an embodiment of the present principles. The coherent beam combining system 500 of FIG. 5 illustratively comprises a first sub-system 101 and a second sub-system 200. The first sub-system 101 comprises a seed laser, 1, providing a master laser beam, 2, a first beam splitter 5 which separates the laser signal into three channels, 6-1, 6-2 and 6-3, a respective first set of phase modulators, 8-1, 8-2 and 8-3, one of the modulators of the first set in each of the three channels, 6-1, 6-2 and 6-3, a second set of phase locking modulators, 20-1, 20-2 and 20-3, one of the modulators of the second set in each of the three channels, 6-1, 6-2 and 6-3, three high power amplifiers 22-1, 22-2 and 22-3, one of the amplifiers in each of the three channels, 6-1, 6-2 and 6-3, three fiber facets 25-1, 25-2 and 25-3, one of the fiber facets in each of the three channels, 6-1, 6-2 and 6-3, three collimating lenses 28-1, 28-2 and 28-3, one of the collimating lenses in each of the three channels, 6-1, 6-2 and 6-3, a focusing lens 30, a focal plane or target 42, a second beam splitter 36, a microscope 51, a camera 52, a monitor 53, and a system controller 48.

In some embodiment in accordance with the present principles, the electro-optic modulators, 8-$j$ and 20-$j$, can comprise an optical crystal selected from the group consisting of lithium niobate ($LiNbO_3$), potassium di-hydrogen phosphate (KDP), potassium di-deuterium phosphate (DKDP), or other known electro-optical material suitable for phase modulation of fiber laser radiation. In addition, in some embodiments in accordance with the present principles, the electro-optic modulators, 8-$j$ and 20-$j$, can be unified into one device using joint electro-optical crystal (e.g., $LiNbO_3$ or the like) equipped with separate pairs of electrodes attached at different locations of crystal. In such embodiments, each pair of electrodes can be used for applying one of the signals. For example, a first pair of electrodes can be used for applying a WNS or PRBS signal to drive an electro-optic crystal fraction for laser linewidth broadening modulator, 8-$j$, and a second pair of electrodes can be used for applying a signal from the system controller 48 (described in greater detail below) to drive another crystal fraction for controlling the phase for phase-locking modulator, 20-$j$. Integrating both modulators 8-$j$ and 20-$j$, into a single optical crystal is advantageous since it reduces the need for beam guiding optics.

The second sub-system 200 comprises a linewidth broadening RF generator 4, a low-pass filter 7, an electronic splitter 16, which splits the RF signal into three channels, 17-1, 17-2 and 17-3, a respective time delay line 18-1, 18-2 and 18-3 in each of the three channels, 17-1, 17-2 and 17-3, and a respective impedance matcher 19 in each of the three channels, 17-1, 17-2 and 17-3.

Figure 7A:
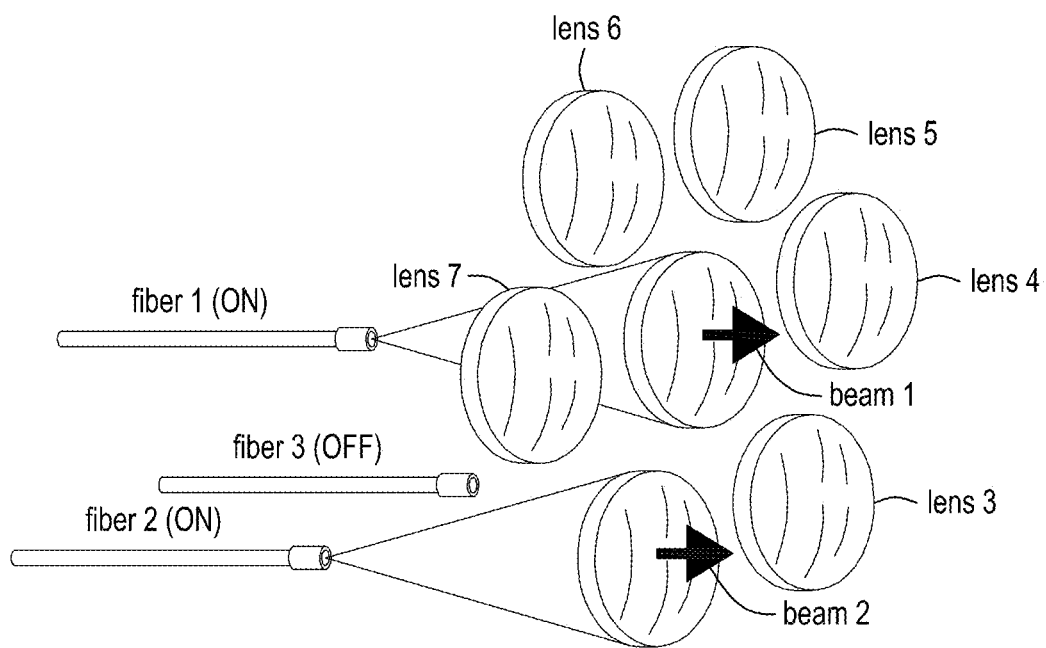
FIG. 7A depicts a high level diagram of a configuration of a seven-channel fiber array in accordance with an embodiment of the present principles.

In some operational embodiments, the coherent beam combining system 500 of FIG. 5 is implemented for synchronizing an arrival time of coherent photons, $C_1$ to $C_N$, to output lenses for multiple channels of a light source such as a fiber array. For example, FIGS. 7A and 8$a$ depict respective high level diagrams of two configurations of a seven-channel fiber array 700 for which the coherent beam combining system 500 of FIG. 5 can be used to synchronize an arrival time of coherent photons, $C_1$ to $C_N$, of the seven channels to output lenses. In the embodiment of FIG. 7A, a central channel, fiber 1, of the seven-channel fiber array 700 and a side channel, fiber 2, of the seven-channel fiber array 700 each carry a laser signal. Upon propagating through the coherent beam combining system 500 of FIG. 5 without any linewidth broadening, the signal from the central channel, fiber 1, and the side channel, fiber 2, of the seven-channel fiber array 700 produce an interference pattern as depicted in FIG. 7B provided that system controller 48 is ON and feedback circuit from photo-sensor 40 to the system controller 48 and delivery circuitry are closed.

Figure 8A:
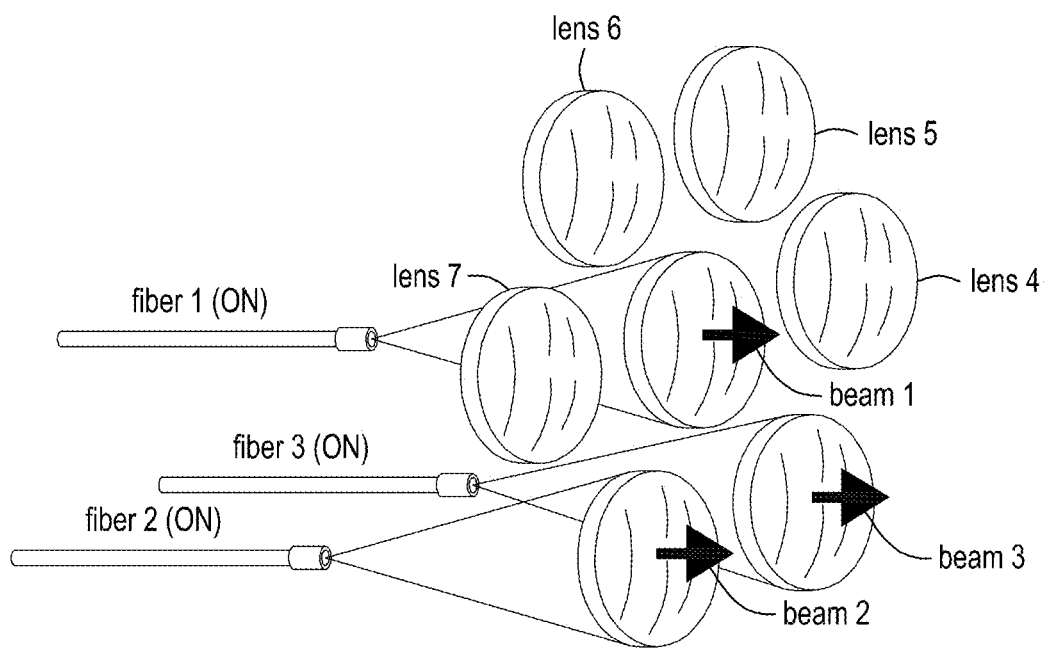
FIG. 8A depicts a high level diagram of configuration of a seven-channel fiber array in accordance with an alternate embodiment of the present principles.
Figure 8B:
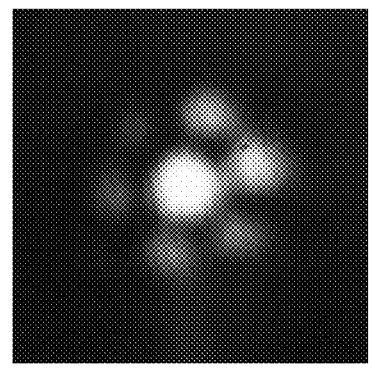
FIG. 8B depicts an interference pattern produced by a signal from the seven-channel fiber array of FIG. 8A, when three neighbor channels are selected in accordance with an embodiment of the present principles.

In the embodiment of FIG. 8A, the central channel, fiber 1, of the seven-channel fiber array 700, and two neighbor channels, fiber 2 and fiber 3, each carry a laser signal. Upon propagating through the coherent beam combining system 500 of FIG. 5 without any linewidth broadening, the signal from the central channel, fiber 1, and the two neighbor channels, fiber 2 and fiber 3, produce an interference pattern as depicted in FIG. 8B, provided that phase locking system controller 48 is ON, thereby providing the closed feedback circuit between photo-sensor 40 and EO modulators 20-$j$.

Figure 7B:
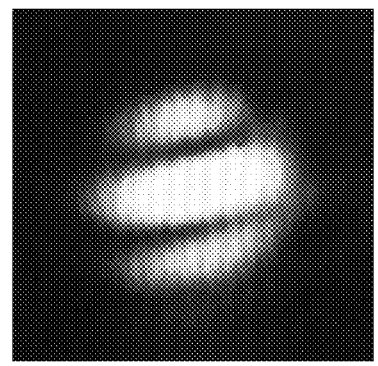
FIG. 7B depicts an interference pattern produced by a signal from the seven-channel fiber array of FIG. 7A, when two neighbor channels are selected in accordance with an embodiment of the present principles.

Although the operational embodiment described below will be described with reference to a configuration of the seven-channel fiber array 700 having active three adjacent channels, such as a reference channel and two neighbor channels, each carrying a laser signal simultaneously (as depicted in FIG. 7B), in alternate embodiments in accordance with the present principles, a signal source, such as the seven-channel fiber array 700 can comprise other combinations of signal channels, being on or off simultaneously, for producing a reproducible interference pattern in accordance with the present principles.

Referring back to FIG. 5, in the first sub-system 101, the seed laser 1 provides a radiation signal with a narrow linewidth (~10 MHz), 3, without any linewidth broadening in which a resulting photon has a long coherence length above tens of meters.

The first beam splitter 5 illustratively separates the laser signal into three optical signals, 2-1, 2-2, and 2-3, in three channels, 6-1, 6-2 and 6-3. Each of the optical signals, 2-1, 2-2, and 2-3, having the same coherence property after splitting. Initially, in each of the channels, 6-1, 6-2 and 6-3, the three optical signals, 2-1, 2-2, and 2-3, pass through the respective first set of phase modulators, 8-1, 8-2 and 8-3, without being broadened and pass through the second set of modulators, 20-1, 20-2 and 20-3. In each of the channels 6-1, 6-2 and 6-3, the three optical signals, 2-1, 2-2, and 2-3, respectively propagate to an input, 21-1, 21-2, and 21-3, of respective amplifiers 22-1, 22-2 and 22-3, at which the optical signals, 2-1, 2-2, and 2-3, are amplified. From the respective outputs 23-1 to 23-3 of the respective amplifiers 22-1, 22-2 and 22-3, the amplified optical signals, 2-1, 2-2, and 2-3, are delivered by delivery fibers, 24-1, 24-2, and 24-3, to high power fiber optic collimator assemblies, 29-$j$, comprising free-space fiber facets, 25-1, 25-2, and 25-3, and collimating lenses, 28-1, 28-2 and 28-3. The distance passed with photons from source of optical signal (seed laser) to the collimating lenses 28-$j$ is defined as an "optical path". The collimator assemblies provide parallel propagation 31-1, 31-2, and 31-2, of previously divergent beams 26-1, 26-2, and 26-3. That is, in each of the channels 6-1, 6-2 and 6-3, a respective one of the collimating lenses 28-1, 28-2 and 28-3, is preferably located at a distance away from a respective one of the fiber facets equal to a focal length of the respective fiber facet thereby providing a collimated beam from each of the collimating lenses 28-1, 28-2 and 28-3 to a focusing lens 30. The focusing lens produces converging beams, 33-1, 33-2, and 33-3, which converge towards a focal plane. In some embodiment in accordance with the present principles, the focusing lens 30 can comprise a Fourier lens. The focusing lens 30 forms an interference pattern at a focal plane which, in some embodiments can include a target 42. As described above, in some embodiments, the interference pattern can comprise an image resembling FIG. 8B. The distance passed with photons from source of optical signal (seed laser) to the focal plane is defined as an "extended optical path".

In some embodiments, and as illustratively depicted in the coherent beam combining system 500 of FIG. 5, a coherent beam combining system in accordance with the present principles can include a narrow slit or pinhole 41 placed behind of the interference pattern 43 for, in one embodiment, selecting the interference strip or central lobe 37 of interference pattern, respectively. In the coherent beam combining system 500 of FIG. 5, a photo-sensor 40 is located behind the slit or pinhole 41 to capture an intensity signal of the interference pattern 43. The pattern is resembled as an interference pattern 35 on monitor 53 in split channel after second beam splitter 36. That is, a signal representative of the photons captured by the photo-sensor 40 are communicated to the system controller 48. The system controller 48 evaluates the photons communicated from the photo-sensor 40 and generates electrical signals to be communicated to the phase locking modulators, 20-1, 20-2 and 20-3, to maximize the intensity of the photons captured by the photo-sensor 40. More specifically, the photo-sensor 40 provides a control signal 47 (input metric) to an input of the system controller 48, forming a feedback loop for intensity maximization of a monitored portion of the interference pattern 43, which in some embodiments can comprise the interference stripe or spot (e.g., central lobe 37). The system controller 48 provides electrical signals, 48-1, 48-2, and 48-3, to the modulators, 20-1, 20-2, and 20-3, to change and lock the optical phases of the three optical signals, 2-1, 2-2, and 2-3, in the three the channels 6-1, 6-2 and 6-3, in accordance with a maximization of an intensity of a selected area 37 (e.g., central lobe) of the interference pattern 35 using a proportional electric signal/input metric 47 generated using a signal from the photo-sensor 40.

Alternatively or in addition, in some embodiments in accordance with the present principles, the fiber facets 25-1, 25-2 and 25-3, can each comprise a respective actuator for repositioning the fiber facets. In such embodiments, shown in FIG. 13, the system controller 48 can communicate signals to the actuators (not shown) through the electronic circuitries 49 to change the positions of fiber facets, 25-1, 25-2 and 25-3, to maximize the intensity of the photons captured by the photo-sensor 40, thereby providing the best overlapping of beams on the photo-sensor 40. More specifically, in such embodiments, the system controller 48 can generate signals to piezoelectric actuators (not shown) changing the positions of the fiber facets 25-$j$, to maximize the intensity of the returned photons captured by, for example, the photo-sensor 40, thereby providing the best overlapping of beams 33-$j$ at a focal plane 42, FIG. 5.

In the first sub-system 101 of the coherent beam combining system 500 of FIG. 5, the second beam splitter 36 is placed into the converging beams formed by the focusing lens 30 before the focal plane/target 42. The beam splitter 36 produces another set of focusing beams, 38, which focus at a second focal plane 34, producing a duplicate interference pattern 35 formed by the focusing lens 30. The duplicated interference pattern 35 is captured by the microscope 51 and communicated to the camera 52 and presented on the monitor 53. Although the embodiment of FIG. 5 includes a photo-sensor 40 for measuring an intensity of the interference pattern and a microscope 51 and camera 52 for capturing the interference pattern, in alternate embodiments in accordance with the present principles, a device for measuring an intensity of the interference pattern and for capturing the interference pattern can comprise a single device (unit).

In summary, in the coherent beam combining system 500 of FIG. 5, the first sub-system 101 provides the continuous coherent combining of beams, 31-1, 31-2, and 31-3, by implementing the feedback loop comprising the input metric 47 as an electrical signal proportional to the intensity of selected area of the interference pattern 43. The interference pattern is visualized in another arm of beam splitter 36 in second focal plane 34 as pattern 35 with, in some embodiments, a central lobe 37 selected with a pinhole 41 having a diameter typically equal or slightly larger than a diameter of the central lobe 37 of the interference pattern. The system controller 48 uses signals received from the feedback loop to shift the optical phases of the electro-optical modulators 20-1, 20-2, and 20-3, in each of the channels, 6-1, 6-2, and 6-3, to maximize an intensity of the captured interference pattern. Due to the fact that the optical outputs of the collimators form the conformal aperture with predetermined architecture, (e.g. hexagonal packing), the resulting interference pattern 35 is well predetermined and is ideally suited for visual evaluation for matching the optical paths of the optical signals in each of the channels, 6-1, 6-2, and 6-3, with sub-wavelength precision. The feedback described in the first sub-system 101 of FIG. 5 is usually running with an operation speed of tens of MHz depending on number of fiber channels, and reliably locks the phases of the optical signals in each of the channels, 6-1, 6-2, and 6-3, thereby accomplishing the coherent combining of beams (CBC) if a linewidth of each of the optical signals is narrower than a bandwidth of feedback.

However, as described above, very fast phase perturbations related with linewidth broadening (i.e., many GHz) will destroy the CBC with subsequent degradation of the interference pattern 35 due to non-synchronous arrival of shortened coherence photons $C_j$ to output optics. The phase-locking can be recovered if the same coherent photons $C_j$ after phase modulators 20-*j* arrive synchronously to the output optics in accordance with the present principles described herein.

In the coherent beam combining system 500 of FIG. 5, the second sub-system 200 provides linewidth broadening of the radiation from the seed laser 1 and synchronization of the arrival of shortened coherence photons from each of the channels, 6-1, 6-2 and 6-3, to output optics. That is, as described above for achieving coherent beam combining (CBC) for N number of "high" power (single mode) fiber lasers/channels, a laser linewidth for each signal to be amplified by a fiber amplifier should be significantly broadened to avoid various non-linear effects, (e.g., Stimulated Brillouin Scattering (SBS). The line broadening, however, produces an effective coherence length, $L_c$, that is significantly smaller than in low power applications and, as such, a means for synchronizing an arrival of shortened coherence photons from each of the channels, 6-1, 6-2 and 6-3, to output optics is needed.

In the second sub-system 200 of the coherent beam combining system 500 of FIG. 5, the linewidth generator 4 provides white noise or pseudo-random bit sequence (PRBS) signals to ultimately broaden the laser radiation from the seed laser 1. In some embodiments in accordance with the present principles, the linewidth generator 4 is capable of broadening an RF bandwidth of the laser radiation from the seed laser 1 from about 10 MHz to tens of GHz (e.g., 30 GHz), to suppress SBS in the high-power fiber amplifiers 22-1, 22-2 and 22-3. In some embodiments in accordance with the present principles, to begin the broadening of the laser radiation from the seed laser 1, the system controller 48 can communicate an electrical signal to the linewidth generator 4, FIGS. 14-16, or a trigger of the linewidth generators 118-*j* through the delay lines 18-*j*, FIG. 17, to begin generating the radio frequency line broadening signals $S_j$, which in FIG. 17 are PRBS signals $S_j$ having pre-determined and equal PRBS structure 13 from each generator 118-*j* and generated by these generators 118-*j* after triggering with split trigger signals $T_j$ which pass through the delay lines 18-*j* after splitting the master trigger signal 17 from trigger generator 104.

The linewidth generator 4, FIG. 5, produces a master broadening RF signal, S, (11). The low-pass filter 7 filters the RF signal, S, (11), from the linewidth generator 4 from some side bands. The filtered output of the linewidth generator 4 is split by the third (electronic) splitter 16 into three RF signals, $S_1$, $S_2$, and $S_3$, which propagate along three channels, 17-1, 17-2 and 17-3. The respective time delay lines, 18-1, 18-2 and 18-3, in each of the three channels, 17-1, 17-2 and 17-3, provide an independent delay time control of the split RF signals from the linewidth generator 4 in each of the three channels, 17-1, 17-2 and 17-3 that are ultimately applied to the first set of phase modulators, 8-1, 8-2 and 8-3 in each of the three channels, 6-1, 6-2 and 6-3, of the first sub-system 101. That is, arrival times of optical photons in each of the three channels, 6-1, 6-2 and 6-3, of the first sub-system 101, are shifted by an electro-optical conversion of coherence of RF signals from the time delay lines, 18-1, 18-2 and 18-3, in each of the three channels, 17-1, 17-2 and 17-3, applied to the signals in the first set of phase modulators, 8-1, 8-2 and 8-3 in each of the three channels, 6-1, 6-2 and 6-3.

In some embodiments, the range of the controlled time delay can be 2-3 ns (60-90 cm of light propagation) for a set of identical fiber amplifiers, such as high-power fiber amplifiers 22-1, 22-2 and 22-3, which have expected optical paths differences $\Delta L_{OP}$ of up to 0.5 m. Due to the fact that time delay lines, 18-1, 18-2 and 18-3, can provide much longer delay times, a set of non-identical, high power fiber amplifiers can be selected, even from different manufacturers, with much larger path differences $\Delta L_{OP}$ up to many meters (i.e., transit time of tens of ns).

In some embodiments in accordance with the present principles, the system controller 48, after communication a signal to cause broadening of the laser radiation from the seed laser 1, monitors the interference pattern captured by the microscope 51 and communicated to the camera 52 and presented on the monitor 53 using for example, signals received from at least one of the camera 52 and the monitor 53 to determine when the interference pattern has degraded. Subsequently, the system controller 48 can communicate an electrical signal to at least one of the time delay lines, 18-1, 18-2 and 18-3, in the three channels, 17-1, 17-2 and 17-3 of the second sub-system 200, to provide a respective time delay that is ultimately applied to a least one of the first set of phase modulators, 8-1, 8-2 and 8-3, in the three channels, 6-1, 6-2 and 6-3, of the first sub-system 101 to attempt to recover the degraded interference pattern caused by the line broadening. Because the system controller 48 is monitoring the interference pattern, the system controller is able to determine when an interference pattern has been degraded and when an interference pattern has been recovered in accordance with the present principles.

Referring back to the second sub-system 200 of the coherent beam combining system 500 of FIG. 5, the impedance matchers 19 in each of the three channels, 17-1, 17-2 and 17-3, match the electrical impedances between the linewidth generator 4 and the first set of phase modulators, 8-1, 8-2 and 8-3, in each of the three channels, 6-1, 6-2 and 6-3, of the first sub-system 101.

Referring back to the second sub-system 200 of the coherent beam combining system 1700 of FIG. 17, the impedance matchers 19 in each of the three channels, 17-1, 17-2 and 17-3, match the electrical impedances between the PRBS linewidth generators 118-$j$ and the first set of phase modulators, 8-1, 8-2 and 8-3, in each of the three channels, 6-1, 6-2 and 6-3, of the first sub-system 101.

Figure 6A:
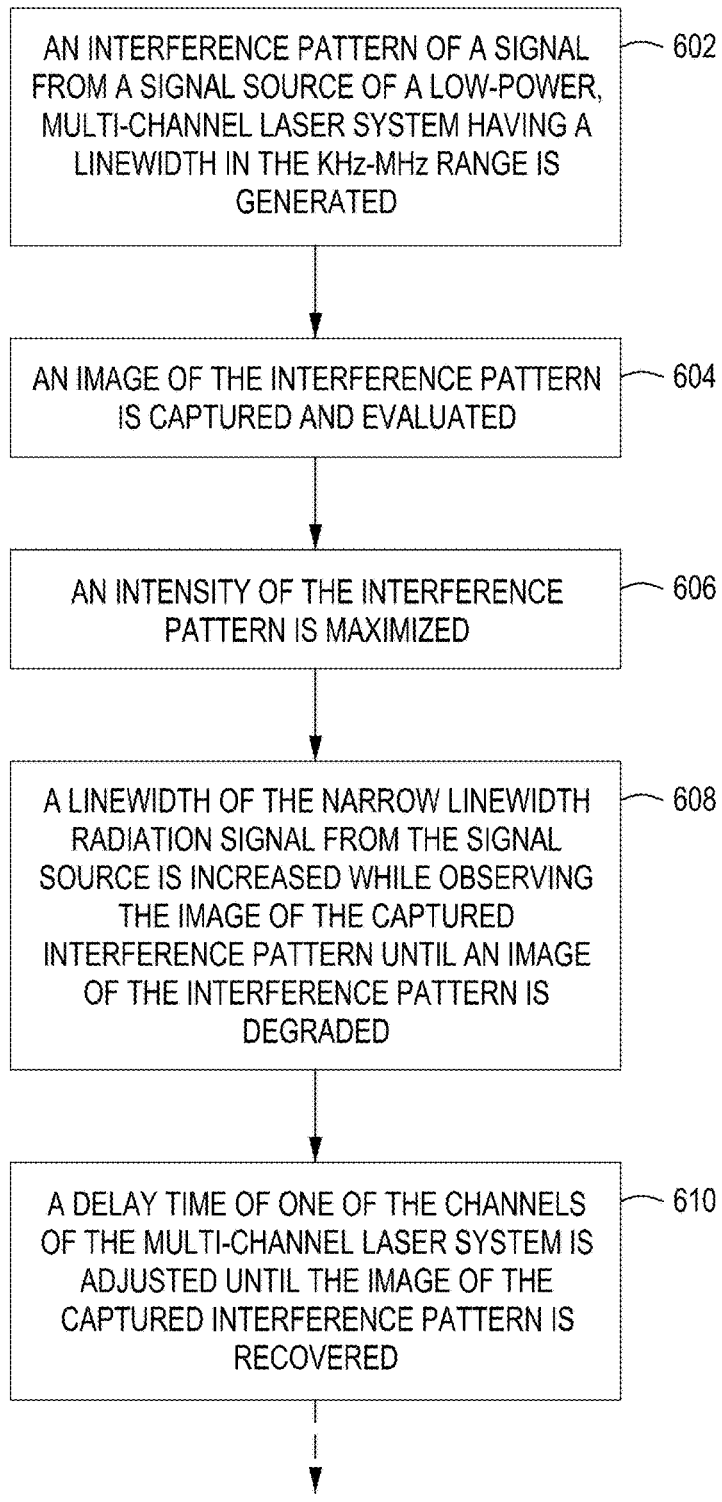
FIG. 6A depicts a flow diagram of a method 600 for coherent beam combining (CBC) of multiple channels in high energy laser (HEL) systems in accordance with an embodiment of the present principles.

FIG. 6A and FIG. 6B depict a flow diagram of a method 600 for coherent beam combining (CBC) of multiple channels in high energy laser (HEL) systems in accordance with an embodiment of the present principles.

The method 600 begins at 602 during which an interference pattern of a signal from a signal source of low-power, multi-channel laser system having a linewidth in the KHz-MHz range is generated. For example, as described above with respect to FIG. 5, the seed laser 1 provides a narrow linewidth (~10 MHz) single-mode radiation signal which split into at least two, preferably three, single mode optical signals which passes through the respective first set of phase modulators, 8-1, 8-2 and 8-3, without being broadened and passes through the second set of modulators, 20-1, 20-2 and 20-3, without being phase locked. In each of the channels 6-1, 6-2 and 6-3, the laser signal is amplified by a respective one of the fiber amplifiers 22-1, 22-2 and 22-3, and passes through a respective one of the fiber facets (fiber outputs) 25-1, 25-2 and 25-3. In each of the channels 6-1, 6-2 and 6-3, the amplified signal passes through a respective one of the collimating lenses 28-1, 28-2 and 28-3, to a focusing lens 30. The focusing lens 30 forms an interference pattern at focal planes 42 and 34. The method 600 can proceed to 604.

At 604, the interference pattern is captured and evaluated as described in the embodiments above. For example, as described above with respect to the embodiment of FIG. 5, the second beam splitter 36 is placed into the converging beams 33-$j$ formed by the focusing lens 30 before the focal plane/target 42. The beam splitter 36 produces another set of focusing beams, 38, which focus at a second focal plane 34, producing a duplicate interference pattern 35 formed by the focusing lens 30. The duplicated interference pattern 35 is captured by the microscope 51 and communicated to the camera 52 and presented on the monitor 53. In such embodiments two, or, preferably three neighbor channels are ON while the rest channels are OFF. The method 600 can proceed to 606.

At 606, an intensity of the selected area of the interference pattern is maximized. For example, as described above, in some embodiments a photo-sensor 40 captures the photons from the focusing lens 30. The photons captured by the photo-sensor 40 are communicated to the system controller 48. The system controller 48 evaluates the photons communicated from the photo-sensor 40 and generates electrical signals to be communicated to the phase locking modulators, 20-1, 20-2 and 20-3, to phase lock the three photons to maximize the intensity of the photons captured by the photo-sensor 40. (See FIG. 9A).

Alternatively or in addition, in some embodiments in accordance with the present principles, the fiber facets 25-1, 25-2 and 25-3, can each comprise a respective actuator (not shown) for repositioning the fiber facets. In such embodiments, the system controller 48 can communicate signals to the actuators through electronic circuitries 49 shown in FIG. 13 to change the positions of fiber facets, 25-1, 25-2 and 25-3, to maximize the intensity of the photons captured by the photo-sensor 42, thereby providing the best overlapping of beams on the target 42. The method 600 can proceed to 608.

At 608, a linewidth of the narrow linewidth (~10 MHz) radiation signal from the signal source, seed laser 1, is increased while observing the image of the captured interference pattern until an image of the interference pattern 35 is degraded to image 54. Upon increasing the linewidth, a coherence length of the photons in each of the three channels, 6-1, 6-2 and 6-3, of the first sub-system 101 will be simultaneously reduced to, for example, $L_c$~30-60 cm or less and optical path differences between at least some of the three channels, 6-1, 6-2 and 6-3, of the first sub-system can become larger than the coherence length of the respective photons. The time overlapping of the photons in each of the three channels, 6-1, 6-2 and 6-3, of the first sub-system 101 is lost. (See FIG. 9B). The method 600 can proceed to 610.

At 610, a delay time of one of the time delay lines, 18-1, 18-2 and 18-3, in the three channels, 17-1, 17-2 and 17-3, is adjusted until the image of the original interference pattern 35 is recovered. For example, in some embodiments in accordance with the present principles one of the three channels, 6-1, 6-2 and 6-3, is selected as a reference channel and no delay from a respective time delay line, 18-1, 18-2 or 18-3, is applied to a phase modulator for that channel. For example, in some embodiments, a first channel, 6-1, can be selected as a reference channel. In such an embodiment, a time delay of either delay line 18-2 or delay line 18-3 can be adjusted, one at a time, until a best image of the interference pattern is recovered. (See FIG. 9C).

The recovery of the best image of the interference pattern will occur when a photon in the second channel, 6-2, or the third channel, 6-3, again overlaps in time with a photon in the first channel, 6-1 (i.e., the reference channel). In the embodiment of the coherent beam combining system 500 of FIG. 5 having three adjacent channels, 6-1, 6-2 and 6-3, and in which the first channel, 6-1, was selected as a reference channel, four equal options for recovery of the interference pattern and stochastic "trial and error" action can be used. That is, in such an embodiment, the delay times of the second time delay line, 18-2, could be increased or decreased or the delay times of the third time delay line, 18-3, could be increased or decreased to attempt to recover the interference pattern. The method 600 can optionally proceed to 611 or can proceed to 612.

At 611, the delay time for the delay line (e.g., delay line 18-2 or 18-3) used to recover the interference pattern is set to a half point between the recovery of the interference pattern with respect to the reference channel and a degradation of the interference pattern when evaluated with respect to the delay line not used to recover the interference pattern. For example, in an embodiment in which a time delay in the second delay line, 18-2, is used to recover the interference pattern, the time delay of the second delay line, 18-2, is set to a half point between the recovery of the interference pattern when a photon in the second channel 6-2 of the first sub-system 101 is overlapping with a photon in the reference, first channel, 6-1, of the first sub-system 101 and a degradation of the interference pattern when a photon in the second channel 6-2 is no longer overlapping with a photon in the third channel, 6-3. With such a configuration, the photon in the second channel 6-2 is considered to be set near a middle point in time between a photon in the first channel, 6-1, of the first sub-system 101 and a photon in the third channel, 6-3, of the first sub-system 101. (See FIGS. 9D and 9E). The method 600 can proceed to 612.

At 612, a linewidth of the radiation signal from the signal source, seed laser 1, is again increased while observing the image of the captured interference pattern until an image of the interference pattern is again degraded. (See FIG. 10A) The method 600 can proceed to 614.

At 614, a delay time of the time delay line, 18-2 or 18-3, not used at 610 above for recovering the image of the interference pattern is adjusted until the image of the original interference pattern is recovered. For example, if, in some embodiments in accordance with the present principles, at 610 above a delay time of the time delay line 18-2 in the second path, 17-2, of the second sub-system 200 is adjusted until a best image of the interference pattern is recovered, at 614 a delay time of the time delay line 18-3 in the third path, 17-3, of the second sub-system 200 is adjusted until a best image of the interference pattern is again recovered. With such a configuration, a photon in a third channel, 6-3, of the first sub-system 101 is shifted by time delay line 18-3 to recover the combinability with a photon in the first, reference channel, 6-1 of the first sub-system 101. The recovery occurs when the photon in the third channel, 6-3, overlaps in time with the photon in the first, reference channel, 6-1. (See FIG. 10B). Two options can be used in a stochastic "trial and error" action for the recovery of a best image of the interference pattern: the delay times of the time delay line 18-3 in the third path, 17-3, can be changed in a positive direction and in a negative direction. The method 600 can optionally proceed to 615 or can be exited.

At 615, the delay time for the third delay line, 18-3, in the third path 17-3 used to recover the interference pattern is set to a half point between the recovery of the interference pattern with respect to the reference channel and a degradation of the interference pattern when evaluated with respect to the second delay line, 18-2, in the second path 17-2. For example, the time delay of the third delay line, 18-3, is set to a half point between the recovery of the interference pattern when a photon in the third channel 6-3 of the first sub-system 101 is overlapping with a photon in the reference, first channel, 6-1, of the first sub-system 101 and a degradation of the interference pattern when a photon in the third channel 6-3 is no longer overlapping with a photon in the second channel, 6-2. With such a configuration, the photon in the third channel 6-3 is considered to be set near a middle point in time between a photon in the first channel, 6-1, of the first sub-system 101 and a photon in the second channel, 6-2, of the first sub-system 101. (See FIG. 10C and FIG. 10D). The method 600 can be exited or can proceed to 616.

At 616, 612-615 above can be repeated until it is determined that photons in the three channels 6-1, 6-2, and 6-3, of the first sub-system 101 of the of the coherent beam combining system 500 of FIG. 5 are satisfactorily aligned in time such that radiation signals in a plurality of channels of a high energy laser (HEL) system can be satisfactorily combined. In addition, the process described above can be repeated until the coherence length of the photons in the channels of a coherent beam combining system in accordance with the present principles reaches a desired length.

For example and with reference to FIG. 11A, after initial alignment of respective photons in the plurality of channels, e.g., channels 6-1, 6-2, and 6-3, of the first sub-system 101 of the of the coherent beam combining system 500 of FIG. 5 as described above, a linewidth of the radiation signal from the signal source, seed laser 1, is again increased while observing the image of the captured interference pattern until an image of the interference pattern is again degraded thus further reducing a coherent length of a photon in accordance with the present principles described above.

Subsequently, a delay time of one of the time delay lines, 18-1, 18-2 and 18-3, in the three paths, 17-1, 17-2 and 17-3, is adjusted until the image of the original interference pattern is recovered. For example, in the embodiment of FIG. 11B, the first channel, 6-1, is selected as a reference channel and the delay line 18-2 in path 17-2 is adjusted until a best image of the interference pattern is recovered. (See FIG. 11)B.

As depicted in the embodiment of FIG. 11C, the time delay of the second delay line, 18-2, is set to a half point between the recovery of the interference pattern when a photon in the second channel 6-2 of the first sub-system 101 is overlapping with a photon in the reference, first channel, 6-1, of the first sub-system 101 and a degradation of the interference pattern when a photon in the second channel 6-2 is no longer overlapping with a photon in the third channel, 6-3. With such a configuration, the photon in the second channel 6-2 is considered to be set near a middle point in time between a photon in the first channel, 6-1, of the first sub-system 101 and a photon in the third channel, 6-3, of the first sub-system 101. (See FIG. 11D).

After synchronizing the signal of the central channel, fiber 1, and the two neighbor channels, fiber 2 and fiber 3, of the seven-channel fiber array 700, as described above, the method 600 of the present principles can proceed to 617 to synchronize the remaining channels of the seven-channel fiber array 700. For example, in some embodiments in accordance with the present principles, central channel, fiber 1 can again be turned on and be used as a reference channel to synchronize signals from the two neighbor channels, fiber 4 and fiber 5, of the seven-channel fiber array 700. After synchronizing the signal of the central channel, fiber 1, and the two neighbor channels, fiber 4 and fiber 5, of the seven-channel fiber array 700, as described above, at 618, the method 600 of the present principles can be implemented to synchronize the final channels of the seven-channel fiber array 700. For example, in some embodiments in accordance with the present principles, central channel, fiber 1, can again be turned on and be used as a reference channel to synchronize signals from the two neighbor channels, fiber 6 and fiber 7, of the seven-channel fiber array 700. That is, at 618, 604-617 can be repeated until a linewidth is broadened to a level of SBS-free operation in all channels of the multi-channel fiber array (e.g., fiber array 700). The method 600 can then be exited.

Figure 12:
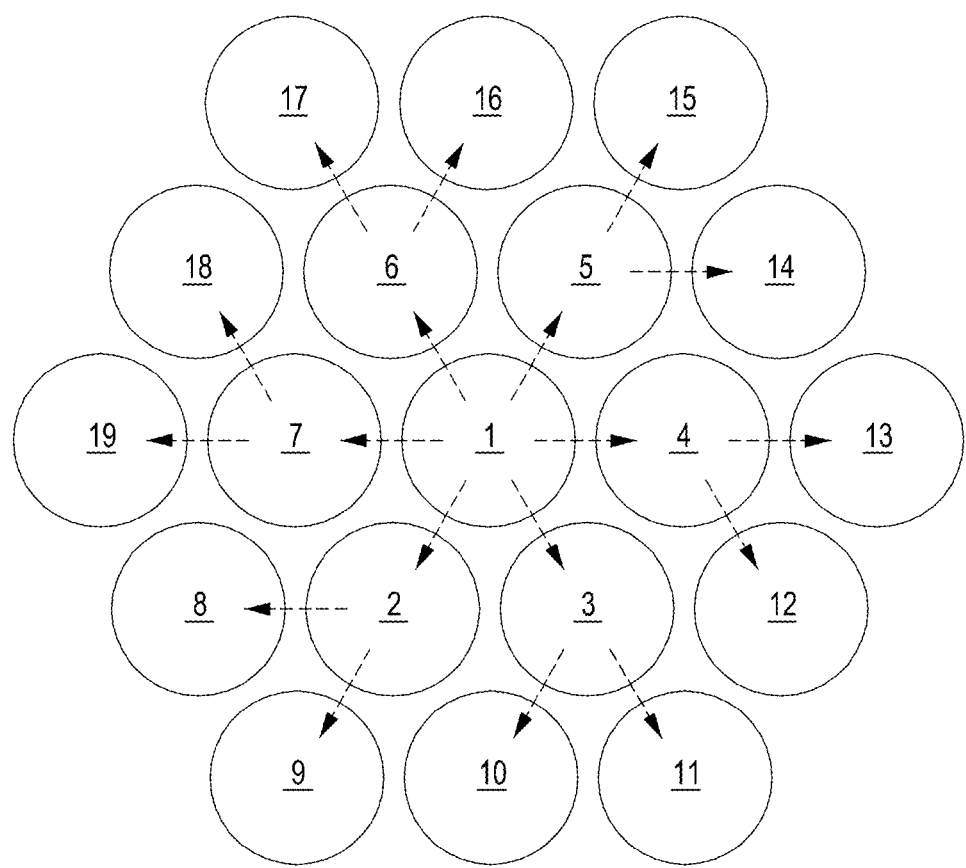
FIG. 12 depicts a high level diagram of a signal source having nineteen channels.

Although in the embodiments of the fiber array 700 of FIGS. 7a and 8a, the fiber array 700 is depicted as comprising 7 channels, in alternate embodiments, embodiments of the present principles can be implemented to synchronize signals from signal sources having more or less channels. For example, FIG. 12 depicts a high level diagram of a signal source having nineteen channels. In the embodiment of FIG. 12, the numbered circles represent collimators of a signal source, such as a fiber array 1200. In the embodiment of FIG. 12, the signal channels of the signal source can be synchronized by, in some embodiments, initially using channel one, represented by collimator 1, as a reference source for synchronizing channels of the inner circle of collimators represented by numbers 1-7 using a method of the present principles, such as method 600 described above. Although in the embodiment described with reference to the method 600 of FIG. 6A and FIG. 6B three channels are synchronized by the method 600, in alternate embodiments in accordance with the present principles, fewer or more channels (e.g., 2, 4, 6 . . . etc) can be synchronized at a time by methods in accordance with the present principles.

For example, in the embodiment of FIG. 12, a signal from the central channel represented by collimator 1, can be used as a reference signal to synchronize signals from channels 1, 2 and 3 as described above. Subsequently, a signal from channel 1 of FIG. 12 can be used as a reference signal to synchronize signals from collimators 4 and 5 and 6 and 7 as described above. In the embodiment of FIG. 12, once all of the signals from the channels of the inner circle of collimators (1-7) have been aligned in accordance with the present principles, in some embodiments, the signals from at least some of the collimators of the inner circle (1-7) can be used to synchronize signals of the outer circle of channels represented by collimators 8-19. For example, in some embodiments, each of the signals of the channels of the inner circle represented by collimators 2-7 can be used, as described above, to synchronize signals of two different channels adjacent to each of the collimators 2-7 of the inner circle. For example in the embodiment of FIG. 12, a signal from inner channel, represented by collimator 2, is used as a reference signal to synchronize the signals from outer channels 8 and 9. In the embodiment of FIG. 12, a signal from inner channel, represented by collimator 3, is used as a reference signal to synchronize the signals from outer channels 10 and 11, and so on. FIG. 12 depicts an exemplary embodiment for aligning the signals of all 19 channels represented by collimators 1-19 and identifies reference channels for aligning the channels in accordance with the present principles.

FIGS. 13-17, which follow depict high level respective block diagrams of various embodiments of coherent beam combining systems in accordance with the present principles. Components of a coherent beam combining system in common with the coherent beam combining system 500 of FIG. 5 will not again necessarily be discussed with respect to FIGS. 13-17. To facilitate understanding, identical reference numerals have been used, where possible, to designate identical elements that are common to the figures.

Figure 13:
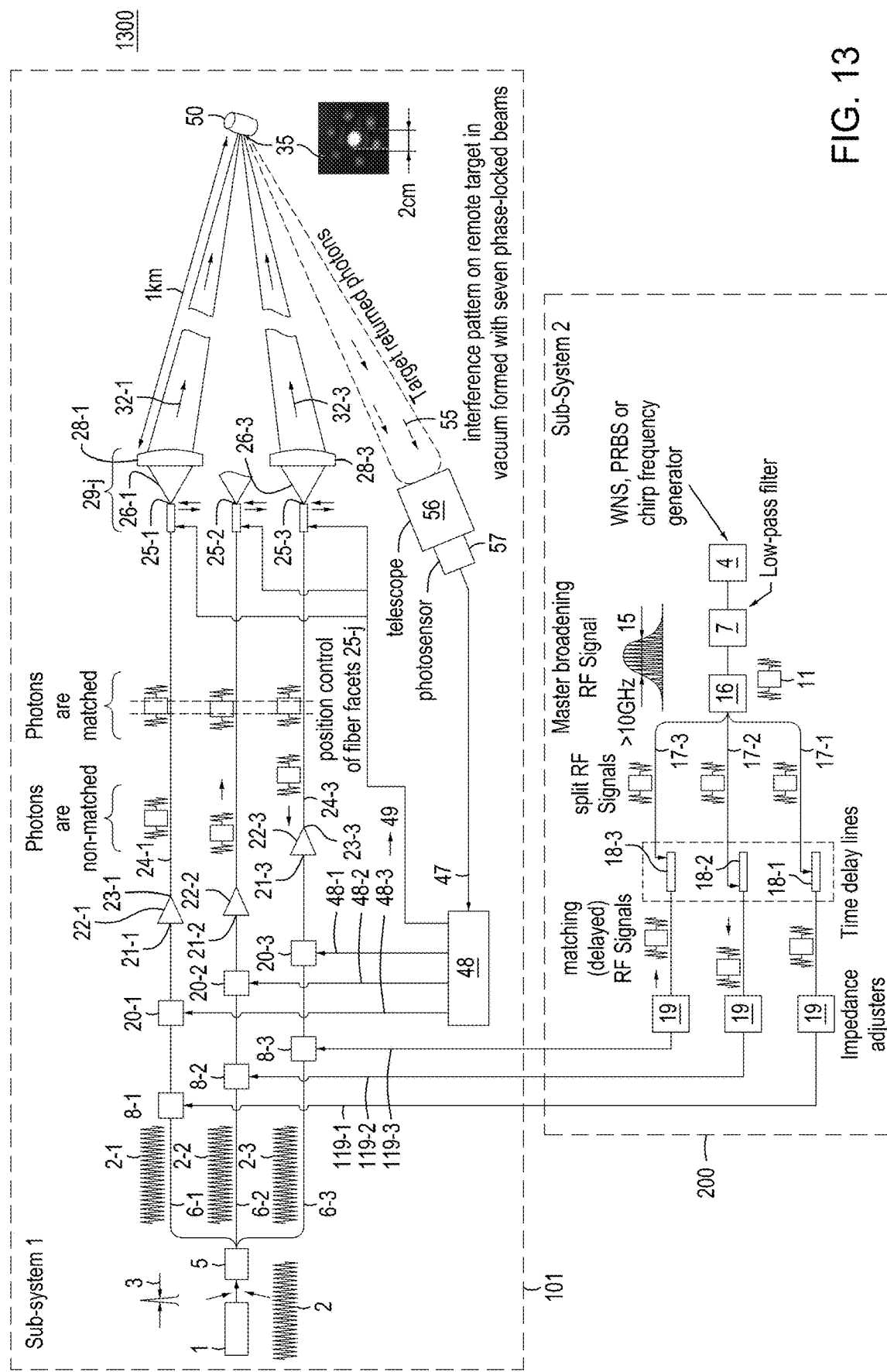
FIG. 13 depicts a high level block diagram of a target in the loop (TIL) coherent beam combining system in accordance with an embodiment of the present principles.

FIG. 13 depicts a high level block diagram of a target in the loop (TIL) coherent beam combining system 1300 in accordance with an embodiment of the present principles. In the coherent beam combining system 1300 of FIG. 13, a target 50 is depicted as being 1 km away from the output lenses, 28-$j$. In the embodiment of the coherent beam combining system 1300 of FIG. 13, the intensity of the target returned photons 55 captured by the telescope 56 and the photo-sensor 57 provides an input metric 47 for the system controller 48 driving the phase and polarization modulators 20-$j$, PM$_{PL}$, and a position of the fiber facets 25-$j$, providing the control signals 48-$j$ to EO modulators 20-$j$ and signals from electronic circuitries 49 to actuators which control the position of facets 25-$j$.

In FIG. 13, an ideal interference pattern 35 on the target 50 for a vacuum is depicted under the target 50 for seven coherently combined beams with a hexagonal arrangement. It should be noted however, that the TIL setup of the coherent beam combining system 1300 of FIG. 13 may not be ideal for the proposed method of matching the fiber optical paths L$_{OP}$ at real atmospheric conditions in accordance with the present principles, due to the fact that the phase information carried by the returned photons 55 can be lost on such long distance (>1 km) or can be corrupted by thermal gradients, turbulence, beam wander, by surface features on a target and the like. It should be noted that the characteristic coherence time of high power beams is thousands times shorter than the photon flight to target and back, (tens of picoseconds versus many microseconds, respectively). As such, a preliminary match in "laboratory conditions" of L$_{OP}$ for all channels for synchronous arrival of coherent photons C$_1$ . . . C$_N$ to planes of output lenses, 28-$j$, with short fiber paths, L$_{OP}$~10 m, will strongly simplify the subsequent "field" phase-locking of beams 32-$j$ on a remote (~1-2 km) target 50 using the coherent beam combining system 1300 of FIG. 13.

In some embodiments in accordance with the present principles, a preliminary match can comprise a "one-time" adjustment of static parameters, L$_{OP}$, in a plurality of fiber channels of a transmitter and can be accomplished in laboratory facilities. The variations of L$_{OP}$'s in the "field" environment are expected as non-significant and relatively slow (~kHz) disturbances and could be easily compensated with fast phase modulators 20-$j$, PM$_{PL}$, and tip/tilt control with fast fiber positioners accomplishing necessary phase-locking and beam overlapping, respectively.

Figure 14:
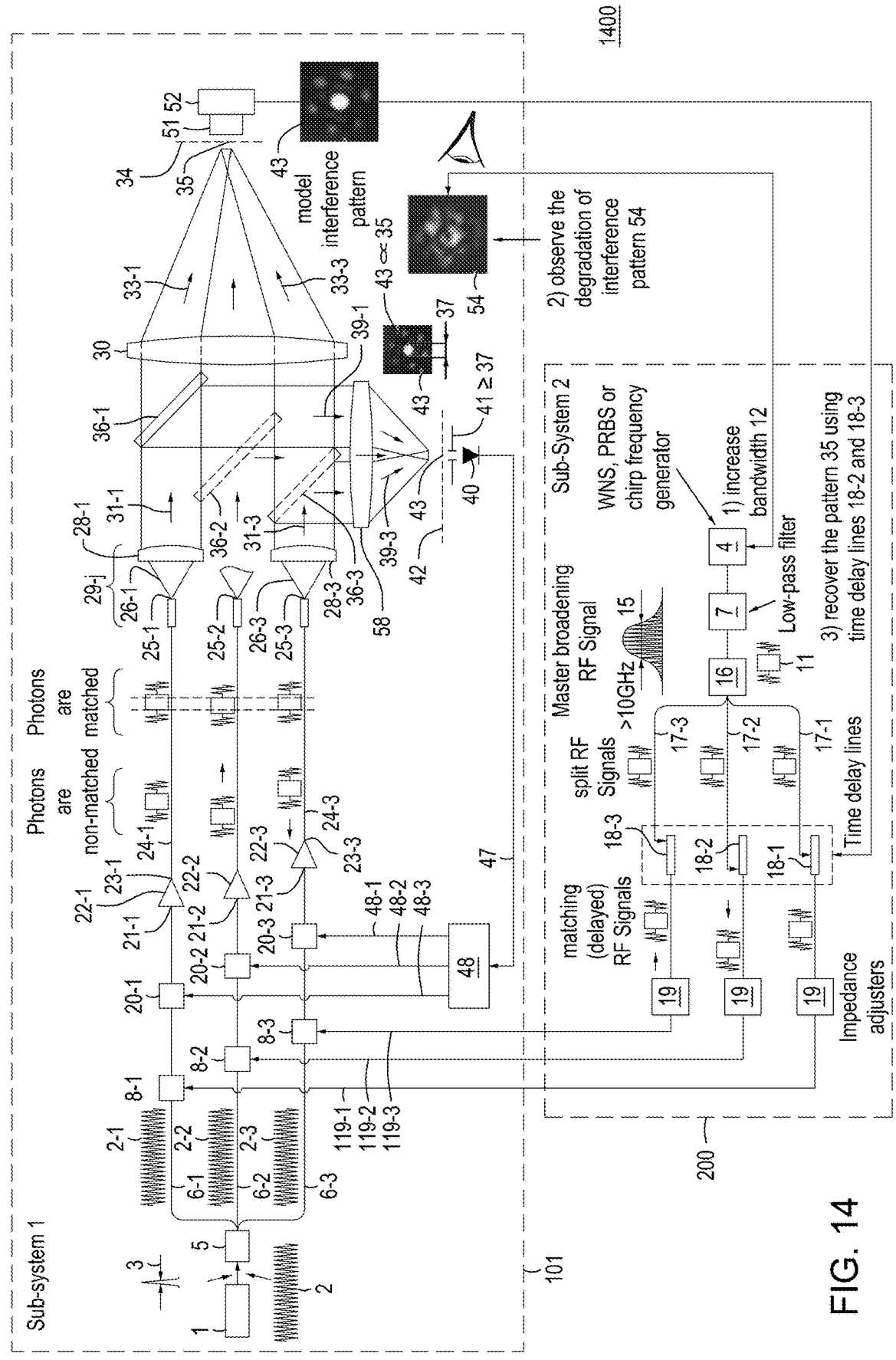
FIG. 14 depicts a high level block diagram of a coherent beam combining system 1400 in accordance with an embodiment of the present principles.

FIG. 14 depicts a high level block diagram of a coherent beam combining system 1400 in accordance with an embodiment of the present principles including beam splitters 36-$j$ in the optical paths of collimated beams 31-$j$ after collimating lenses 28-$j$. In the coherent beam combining system 1400 of FIG. 14, beam splitters 36-$j$ are located in the output beams 31-$j$. Intercepted sub-beams 39-$j$ are collected with a second Fourier lens 58 and form the interference pattern 43 in focal plane 42 of the second Fourier lens 58. The interference pattern 43 is similar to pattern 35 but can have different dimensions proportional to a focal lengths ratio between lenses 30 and 58.

Figure 15:
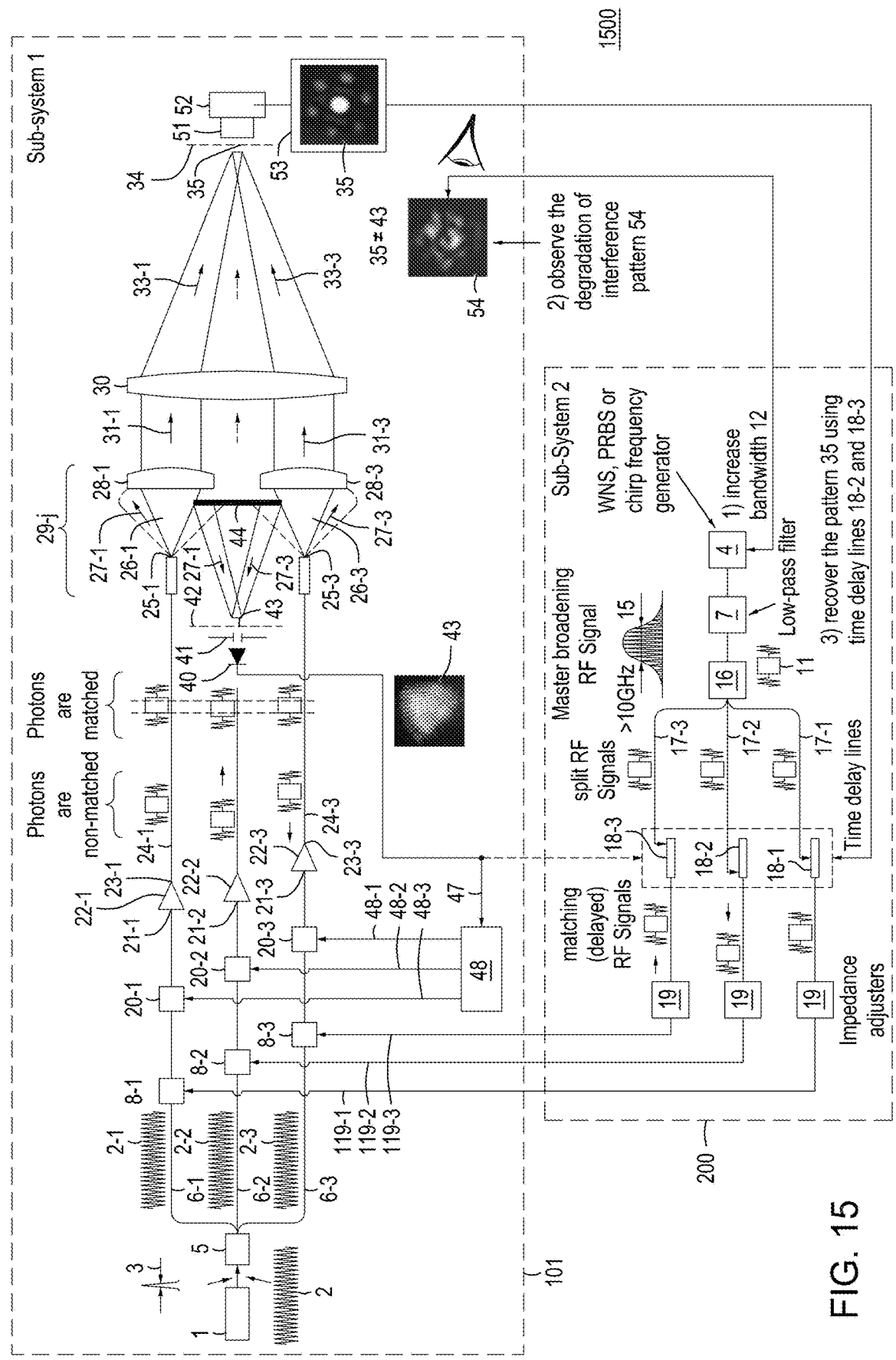
FIG. 15 depicts a high level block diagram of a coherent beam combining system 1500 in accordance with an embodiment of the present principles.

FIG. 15 depicts a high level block diagram of a coherent beam combining system 1500 in accordance with an embodiment of the present principles including internal phase-locking [Ref. L. A. Beresnev, et al . . . SPIE-2011]. In the coherent beam combining system 1500 of FIG. 15, the second sub-system 200 is based on synchronization of signals using an input metric 47 provided with diffractive optic elements (DOE) 44 of the output optics. The phase-locking shown in the embodiment of FIG. 15 is accomplished using an "internal" metric in which the phase carriers are the periphery areas, 27-$j$, of divergent Gaussian beams, 26-$j$, before the beams reach the output lenses 28-$j$. In the coherent beam combining system 1500 of FIG. 15, three sub-beams 27-$j$ are intercepted inside of the output array by means of diffractive optic elements (DOE) 44, which, in FIG. 15, represent three off-axis parabolic mirrors. The DOE 44 re-directs sub-beams 27-$j$ on back of the array in between the collimators 29-$j$ and the beams 27-$j$ are focused on focal plane 42 with the interference pattern 43. The pinhole 41 selects one spot from this interference pattern 43 and the photo-sensor 40 behind of the pinhole 41 provides a metric as an electrical signal/input metric 47 proportional to spot intensity. This setup is very suitable for coherent beam combining in, for example, a conformal aperture array of high power collimators 28-$j$ because the intensity of periphery areas 27-$j$ of Gaussian beams (beam tails) is small and the power in the interference spot is on the order of milli-watts for kW class fiber channels, thereby providing a non-heat-producing operation of photo-sensor/pinhole assembly 40-41.

Figure 16:
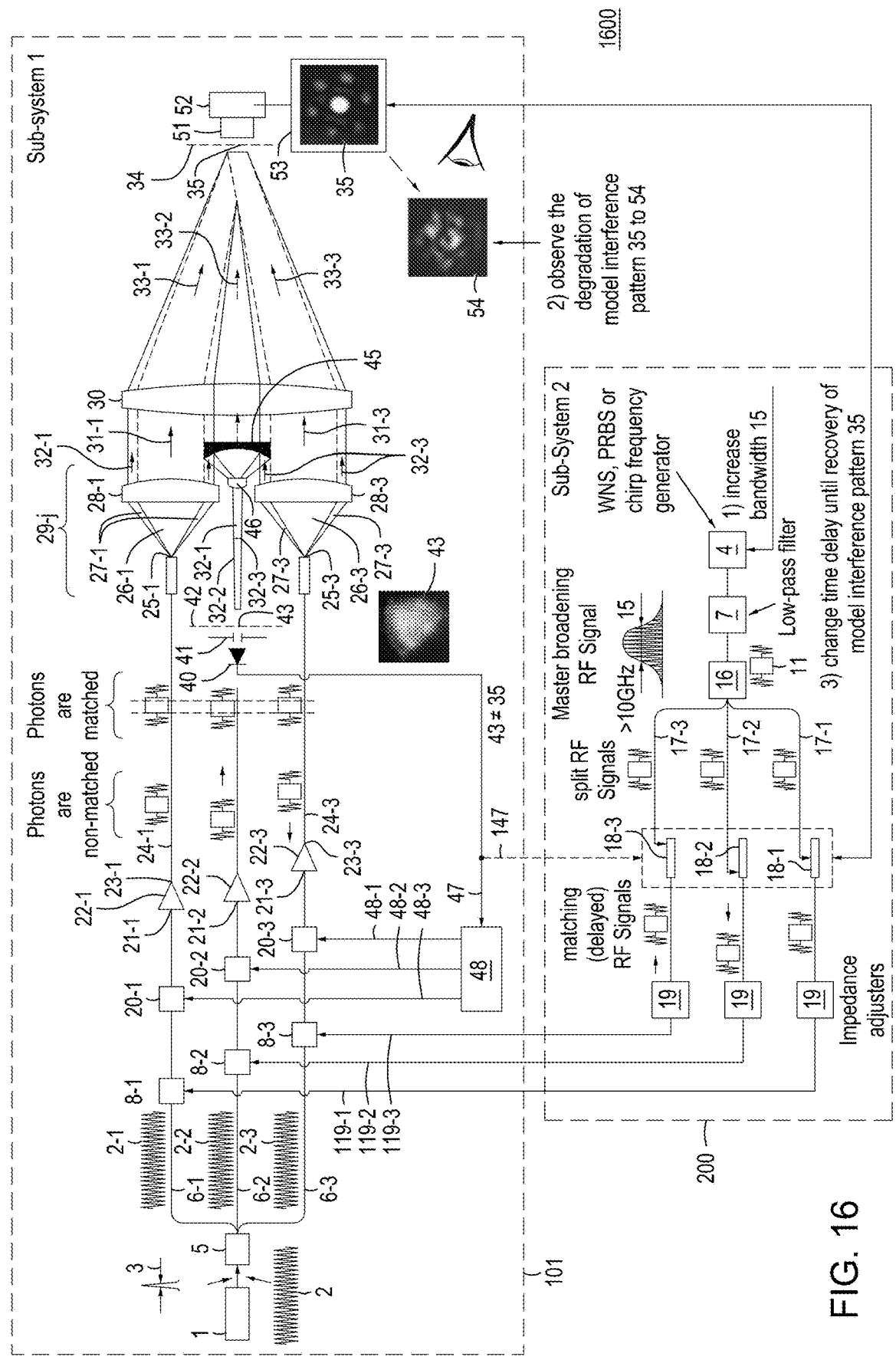
FIG. 16 depicts a high level block diagram of a coherent beam combining system 1600 in accordance with an embodiment of the present principles.
Figure 17:
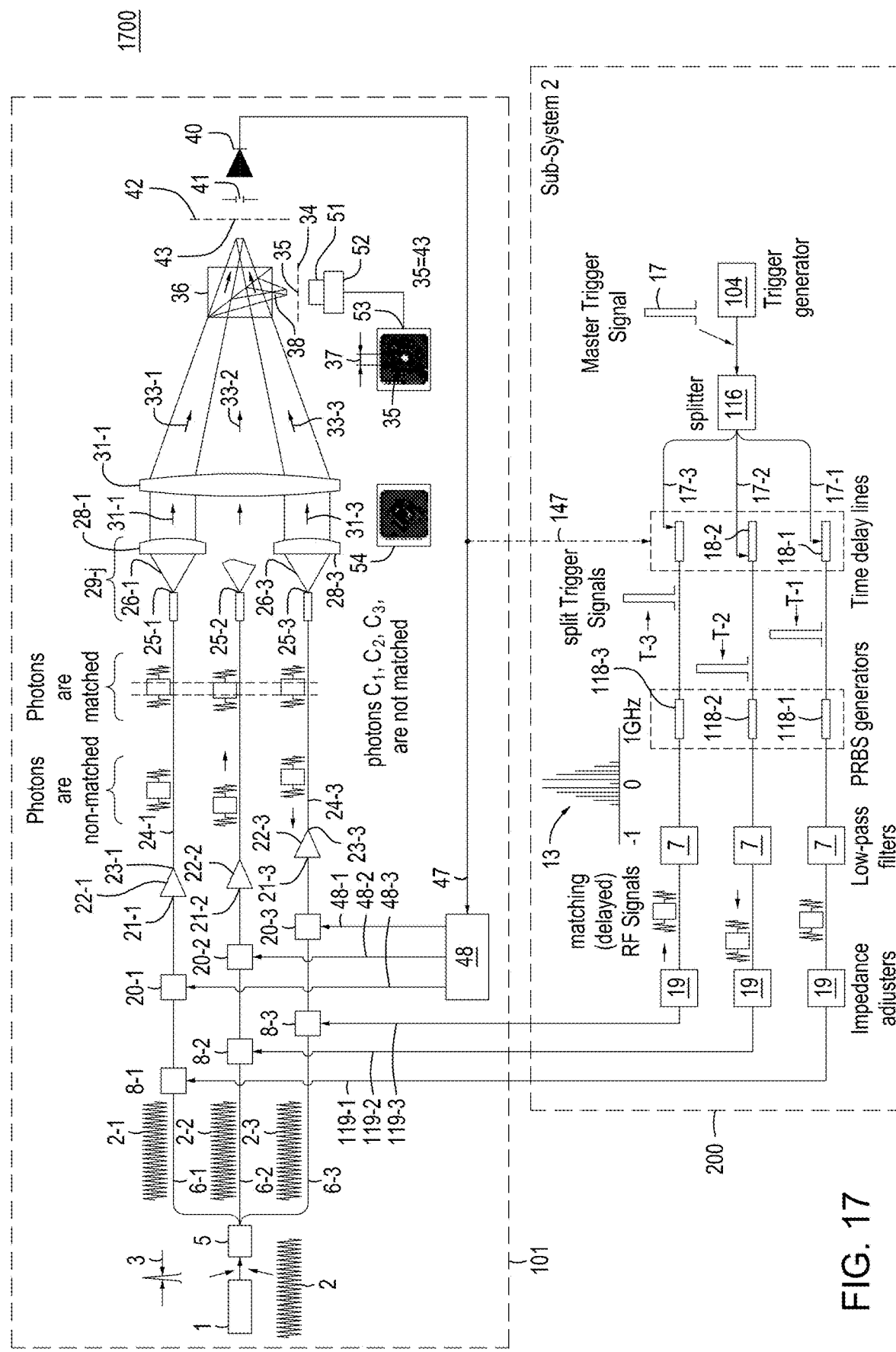
FIG. 17 depicts a high level block diagram of a coherent beam combining system 1700 in accordance with an embodiment of the present principles.

FIG. 16 depicts a high level block diagram of a coherent beam combining system 1600 in accordance with an embodiment of the present principles including near field coherent beam combining using micro-mirrors and micro-lenses, described in U.S. Pat. No. 9,454,004 by Beresnev, Liu and Carhart. The coherent beam combining system 1600 of FIG. 16 is similar to the coherent beam combining system 1500 of FIG. 15 with the exception that the coherent beam combining system 1600 of FIG. 16 further includes respective micro mirrors 45 and micro lenses 46 which form an interference pattern from three sub-beams, 32-1, 32-2, 32-3, intercepted with micro mirror 45 and micro lense 46 from three collimated beams 31-*j* after three adjacent lenses, 28-1, 28-2, 28-3. In the coherent beam combining system 1600 of FIG. 16, the three sub-beams, 32-1, 32-2, 32-3, are focused on focal plane 42 with the interference pattern 43. The pinhole 41 selects one spot from this interference pattern 43 and photo-sensor 40 behind of pinhole 41 provides the metric as an electrical signal/input metric 47 proportional to spot intensity. In the coherent beam combining system 1600 of FIG. 16, the interference pattern 43 has a larger spot size of 50-100 µm as compared with the spot size of 10-15 µm for the interference pattern of the coherent beam combining system 1500 of FIG. 15.

FIG. 17 depicts a high level block diagram of a coherent beam combining system 1700 in accordance with an embodiment of the present principles including a modified second sub-system, 200, having separate but equal PRBS generators 118-*j* in the separate paths of the second sub-system, 200. Although in the embodiment of FIG. 17, the first sub-system, 101, is depicted as comprising the first subsystem 101 of the coherent beam combining system 500 of FIG. 5, in alternate embodiments in accordance with the present principles, the first subsystem, 101, can comprise the first subsystem 101 of any coherent beam combining system in accordance with the present principles, such as the first subsystem, 101, of coherent beam combining systems 1300, 1400, 1500 and 1600 of FIGS. 13-16.

In the embodiment of the coherent beam combining system 1700 of FIG. 17, in the second sub-system, 200, the linewidth broadening modulators 8-*j* are driven with separate but equal PRBS generators 118-*j* generating similar PRBS signals, S$_j$. Each PRBS generator is set to generate the signal with the same clock rate (in GHz range) and the same power n of elementary pulses (tenth of nanosecond duration) in time length of PRBS signal ~($2^n-1$). All PRBS generators 118-*j* are activated with trigger signals T-j, propagating from "trigger" generator 104 generating the Master trigger signal, T, with appropriate trigger clock rate for quasi-continuous activating the PRBS~($2^n-1$) signal. In the embodiment of FIG. 17, the Master trigger signal T, 17, has a simple (e.g. rectangular) shape, and is split with the splitter 116 into secondary trigger signals T-j delivered into electronic paths 17-*j*, the paths having simple delay lines 18-*j* for control of a transit time of trigger signals T-j. In alternate embodiments in accordance with the present principles, the Master trigger signal 17, T, can comprise a rectangular, triangle or other simple shape RF signals in a MHz-GHz range.

In the embodiment of the coherent beam combining system 1700 of FIG. 17, each gradual increase of PRBS bandwidth should be accomplished simultaneously in all generators 118-*j* providing the same PRBS pattern to modulators 8-*j* of neighbor collimators. In addition, in the embodiment of the coherent beam combining system 1700 of FIG. 17, when a goal bandwidth is achieved on adjacent channels synchronized in, for example a first round, the same found PRSB parameters, n and clock rate, should be considered as a "goal set" in subsequent steps for matching optical paths of all channels.

In the embodiment of the coherent beam combining system 1700 of FIG. 17, electronic circuitries between PRBS generators 118-*j* and modulators 8-*j* with impedance adjusters 19 could be accomplished in robust and stable environment, like monolithic box. Probable thermal and mechanical disturbances on synchronous arrival of photons C$_1$ to output lenses 28-*j* can be mitigated with automatic control of time delay lines 18-*j*, with appropriate feedback loop 147 using the phase-locking input metric 47.

The following steps represent a process for coherent beam combining (CBC) of multiple channels in high energy laser (HEL) systems in a coherent beam combining system, such as the coherent beam combining system 500 of FIG. 5, in accordance with another embodiment of the present principles.

1.0. Determine a linewidth in each fiber amplifier providing the maximum SBS-free output power (goal power) according to a specification of the amplifiers.

1.1. Set the linewidth of a seed laser with the coherence length (initial coherence length L$_c$) exceeding the length of any optical path L$_{OP}$ of adjacent channels.

1.2. Split the seed laser radiation into plurality N of low-power optical fiber channels equal to number N of amplified fiber array channels.

1.3. Provide each channel with at least one first electro-optical modulator capable of broadening a linewidth of the optical radiation according to applied linewidth broadening and at least one second electro-optical modulator capable of shifting in a controlled manner the phase of fiber radiation according to phase-locking electric signals. Provide the amplification of each split and modulated beam using fiber amplifiers, provide apparatus for collimating the plurality of output amplified beams and for overlapping the beams on a focal plane using a focusing lens 30.

1.4. Provide at least two electronic modules; first, a WNS, chirped frequency or PRBS generator generating linewidth broadening electric signals to the first electro-optical modulators, and, second, a system controller for generating phase-locking electric signals to the second electro-optical modulators.

1.5. Provide electric signal delay lines connecting the first electro-optical modulators with the linewidth broadening generator.

1.6. Select a number of adjacent channels (e.g., two (square packaging of collimators) or three (hexagon packaging)) and lock the phases of beams having the initial linewidth with initial coherence length L$_c$, activate the phase-locking using one of the following feedback setups: 1) power in the bucket system with interference of adjacent beams in a focal plane of the focusing lens (i.e., FIG. 5), 2) interference of sub-beams split by near-field beam splitters in collimated beams (i.e., FIG. 14); 3) internal beam tail interference of three intercepted peripheral divergent sub-beams (FIG. 15); 4) near-field external beam tail interference of three intercepted peripheral collimated sub-beams (FIG. 16); provide the input metric 47 to an input of the system controller 48, where the input metric 47 is proportional to an electric signal from a photo-sensor 40 sensing the intensity of the selected area 37 of an interference pattern (e.g. central lobe of the interference pattern 35), the phase-locking voltages provided by outputs of the system controller and applied to the second electro-optic modulators 20-*j* in the low-power fiber channels before the high power fiber amplifiers 22-*j*; 5) record the model interference pattern 35 at the focal plane 34 for further reference.

1.7. Apply the broaden linewidth signals S$_j$ from the generator 4 to the first electro-optical modulators through the time delay lines 18-*j* placed between the generator and the first electro-optical modulator(s) 8-*j*.

1.8. Decrease gradually the coherence length L$_c$ in low-power channels 6-*j* to less than any optical paths L$_{OP}$ of adjacent channels by gradual broadening the linewidth in the low-power fiber optic channels (e.g. increase the WNS spectrum width or parameters n and/or clock-rate in case of PRBS) until the model interference pattern 35 is degraded to image 54 due to loss of phase-locking between some fiber channels related to the non-synchronous arrival of shorten photons, $C_j$.

1.9. Keep the one fiber optic channel as a reference channel and set stochastically the time delay, δt, of adjacent channels until the recovery of model interference pattern, indicating the recovery of phase-locking of synchronously arrived coherent photons $C_j$ to output optics. Note the delay line and record the time delay as 1.9.1. Continue to change the time delay in the same direction until a next deterioration of the model interference pattern which signifies the loss of phase-locking between a selected and the reference channel. Record this time as $t_2$ and calculate $\Delta t = t_2 - t_1$.

1.9.2. Put the delay time in found delay line $\delta t = \Delta t/2$ for the recovery of the model interference pattern 35 and the most stable CBC performance of selected channels.

1.10. In case of multiple (e.g., three) adjacent channels, set stochastically the delay times between each from the two controlled channels and non-disturbed reference channel. Follow to the procedure described in previous step 1.9, until all (e.g., three) adjacent channels are reliably phase-locked.

1.11. (Repeat of step 1.8). Further decrease gradually the coherence length by means of broadening the linewidth in low-power fiber optic channels until the degradation of the model interference pattern signifying the loss of phase-locking.

1.12. (Repeat of step 1.9). Keep the one fiber optic channel as a reference channel and set gradually the time delays, St, of each adjacent channels until the model interference pattern is recovered signifying the recovery of phase-locking.

1.12.1. Continue to change the time delay in the same direction until next deterioration of the model interference pattern signifying the loss of phase-locking between the selected and the reference channels. Record this time as $t_2$ and calculate $\Delta t = t_2 - t_1$.

1.12.2. Put the delay time in the found delay line $\delta t = \Delta t/2$ for the recovery of the model interference pattern and the most stable CBC performance of selected channels.

1.13. Repeat steps 1.9-1.12 until the linewidth will reach the goal linewidth providing the SBS-free goal power and simultaneously the coherent beam combining of selected channels (e.g., two or three) is approved. Record the selected channels as synchronized channels.

1.14. Select a secondary reference channel from the synchronized channels; select next adjacent non-synchronized channels (i.e., one (square packing) or two (hexagon packing)).

1.15. Repeat steps 1.9 to 1.14 until all channels are synchronized with a goal linewidth providing the SBS-free goal power.

In some embodiment in accordance with the present principles a fiber laser system includes a seed laser providing a primary optical signal with a primary, narrow linewidth as a primary coherent photon with a primary, maximum coherence length defined as a reciprocal linewidth, where the coherent length is defined by a transit time of the photon having the speed of light; a fiber splitter for splitting the primary optical signal into a plurality of secondary fiber optic channels providing secondary coherent photons repeating the coherence of the primary coherent photon; a first plurality of electro-optical modulators placed in the secondary fiber optic channels, the electro-optical modulators capable of broadening the linewidth of the secondary coherent photons in the split secondary channels from the primary linewidth to a maximum, desired linewidth; a first plurality of equal radio frequency (RF) signals applied to the first plurality of electro-optical modulators; an electronic sub-system delivering the first plurality of equal RF signals to the electro-optical modulators with controlled delivery times; wherein the electronic sub-system comprises; a generator of master broadening signals; an electronic splitter splitting the master signal into split electronic signals delivered into separate channels; electronic time delay lines capable of controlling a transit time of signals to first plurality of electro-optical modulators; a plurality of fiber amplifiers for amplifying the optical signals in the secondary channels; a plurality of delivery fibers with proximal and distal ends, the proximal ends communicating with the amplifiers and the distal ends having emitting fiber facets comprising a means for controlling a motion of the fiber facets in a plane perpendicular to the fiber distal ends, where the facets deliver into free-space, a plurality of amplified divergent laser beams with a Gaussian intensity distribution, the distribution having a first portion of optical power (high power) near the central axis of the Gaussian beam (maximum portion) and beam tails in periphery areas with a second portion (low power) of the Gaussian beams, where the plurality of the secondary optic channels with the fiber amplifiers and the delivery fibers constitute a plurality of optical paths for the primary coherent photon; a second plurality of electro-optical modulators placed in secondary fiber channels and capable of shifting the optical phases of optical signals in each of the secondary channels; a beam forming apparatus capable of converting the amplified divergent laser beams into collimated beams where the beam forming apparatus comprises a plurality of lenses placed approximately at focal distances of the fiber facets providing the conversion of the divergent amplified laser beams carrying the first portion of the divergent Gaussian beam and at least a fraction of the second portion of the divergent Gaussian beam into the amplified collimated beams each having the Gaussian distribution with the first and with at least a fraction of the second portion, where the facets and the lenses form the fiber laser collimators, where the collimators are arranged into the array of fiber laser collimators, the array providing the parallel propagation of the amplified collimated beams; a beam combining apparatus providing a combination of the plurality of amplified collimated beams and the formation of the interference pattern on at least one of a first focal plane and on a split, second focal plane; a first focal lens converging and overlapping the amplified beams on the first focal plane and on the split, second focal plane; a first beam splitter splitting the portion of intensity of the plurality of amplified converging beams and/or a second beam splitter splitting the portion of the plurality of the amplified collimated beams to observation channel with observation focal plane and to the photo-sensor channel at the photo-sensor focal plane; a video-camera including a display in the observation channel, where the video-camera provides a split image of the interference pattern formed on the observation focal plane; a photo-sensor in the photo-sensor channel providing an electrical signal (metric) proportional to an intensity of a selected area of the interference pattern formed on the first (photo-sensor) focal plane; an electronic processor comprising an input and a plurality of outputs, the input receiving the metric signal and the outputs providing the control electronic signals to the second plurality of electro-optical modulators and to a control means providing the re-positioning of fiber facets; a feedback comprising a "hill climbing" algorithm providing a maximization of the metric by controlling a position of the facets and a shift of the optical phases and alignment of polarization planes of photons in one direction providing an overlapping and coherent combination on a target or on the first focal plane of the beams from the amplified collimated beams which have approximately the same transit times of the secondary coherent photons from the fiber splitter to the focal plane of the first focus lens; an exemplary interference pattern obtained by the video-camera in the observation channel at a maximum of the metric, the exemplary pattern formed in the observation focal plane by the coherent combination of a plurality of all of the amplified collimated beams of the array, where the beams have an initial coherence length exceeding the largest extended optical path, where the fiber laser system provides the coherent beam combining (CBC) of the amplified collimated laser beams having the goal linewidth exceeding the SBS threshold linewidth thereby providing the SBS-free goal power by selecting the sets of a reference collimated beam and at least one other collimated beam from the array, activating the feedback, obtaining the exemplary interference pattern in the focal plane of the focus lens, increasing a bandwidth of the RF generators from the initial bandwidth to the goal bandwidth with an iterative approach to the goal bandwidth through the sequence of degradation of the exemplary interference pattern associated with a linewidth increase with consequent recovery of the exemplary pattern by stochastic changes of the time delay of the secondary coherent photons in the extended paths of the at least one other amplified collimated beam (ACB) thereby providing the recovery of the synchronous arrival of the amplified coherent photons of the reference collimated beam and of the at least one other collimated beam to the focusing lens thereby providing the match of the extended optical paths for the photons in the plurality of fiber optic channels.

In some embodiments and, for example, referring to FIG. 15, a method for coherent beam combining of plurality of free-space emitted fiber laser beams with broaden linewidth (goal linewidth), where the goal linewidth provides the Stimulated-Brillouin-Scattering-free (SBS-free) generation of fiber laser beams with goal power, includes generating a low-power master laser beam 2 with narrow linewidth 3 (initial linewidth) and with coherence length (initial coherence length) exceeding the optical path from a plurality of fiber channels delivering the plurality of free-space beams 26-$j$; splitting the master laser beam 2 into plurality of fiber channels 6-$j$ each carrying the split low-power fiber beam repeating the linewidth 3 and coherence of the master laser beam 2; amplifying the low-power split beams with amplifiers 22-$j$; from the respective outputs 23-1 to 23-3 of the respective amplifiers 22-1, 22-2 and 22-3, delivering amplified beams to a plurality of free-space fiber facets 25-$j$ through the fiber optic channels 24-$j$ where the optical paths are defined with transit times as a ratio of the paths to the speed of light; emitting the amplified beams into free-space through the plurality of fiber facets 25-$j$, the beams 26-$j$ diverging and having approximately Gaussian profile with a central area carrying the main portion of beam energy and periphery areas (tails) carrying the low-energy portion; providing the collimation of the divergent beams 26-$j$ into approximately parallel, collimated beams 31-$j$ propagating in parallel directions by means of a plurality of collimating lenses 28-$j$, where the lenses are placed at a distance from the fiber facets 25-$j$ approximately equal to the focal lengths of the lenses; focusing the parallel, collimated beams 31-$j$ into the same spot on a target or on an observation/focal plane 34; providing the first plurality of electro-optical modulators $EOM_{BR}$ 8-$j$ into split fiber channels 6-$j$ before amplification of the split beams 2-$j$, where the electro-optical modulators $EOM_{BR}$ 8-$j$, are capable of broadening the linewidth of split beams 2-$j$ in accordance with radio-frequency $RF_{BR}$ signals $S_j$ applied to the electro-optical modulators $EOM_{BR}$ 8-$j$; providing the second plurality of electro-optical modulators $EOM_{PL}$, 20-$j$, into split fiber channels 6-$j$ before or after the electro-optical modulators $EOM_{BR}$ 8-$j$ and before an amplification of the low-power split beams 2-$j$ with amplifiers 22-$j$, where the modulators $EOM_{PL}$ 20-$j$ are capable of changing and locking the optical phases (Phase-Locking) of split, low-power beams 2-$j$ in accordance with applied electronic output/control signals 48-$j$; providing the reference (model) interference pattern 35 on a target 50 or on an observation/focal plane 34 by means of applying electronic output/control signals 48-$j$ to the modulators $EOM_{PL}$ 20-$j$ from the system controller 48 in accordance with maximization of intensity of the selected area 37 (e.g., central lobe) of the interference pattern 35, where the intensity measurement generates a proportional electric signal by means of, for example, a photo-sensor 40 providing the input metric 47 for the system controller 48; providing the plurality of equal broadening RF signals $S_j$ to the electro-optical modulators $EOM_{BR}$ 8-$j$, where the signals $S_j$ are capable of being independently delayed thereby providing the corresponding delay of photons $C_1$ of split fiber laser beams with delay time exceeding any differences in the transit times of photons passing through any fiber optic channel from the beam splitter 5 of master laser beam 2 to the collimating lenses 28-$j$; providing the gradual broadening of linewidths of split fiber laser beams 2-$j$ by applying the equal $RF_{BR}$ signals $S_j$ 119-$j$ to each electro-optical modulators $EOM_{BR}$, 8-$j$, until the degradation and/or loss of stability of the model interference pattern 35; providing the stochastic changes of delay times of laser photons in split fiber laser beams by means of stochastic changes in delay times of the radio-frequency $RF_{BR}$ signals $S_j$ 119-$j$ until recovery of the model interference pattern 35 with simultaneous maximization of intensity of the selected area 37 (e.g., central lobe) of the pattern and corresponding maximization of the input metric 47; repeating iteratively the gradual broadening of linewidth of selected neighbor beams until the degradation of model interference pattern and subsequent stochastic changes of delay times of the radio-frequency $RF_{BR}$ signals $S_j$ 119-$j$ with recovery of the model interference pattern 35, until the linewidth in all neighbor beams will be broadened to a goal linewidth providing the SBS-free generation of goal power from each fiber channel, and transit times of photons in split fiber channels from the beam splitter 5 of master laser beam 2 to output lenses 28-$j$, 30 or to observation/focal plane 34 will be approximately equal providing the synchronous arrival of split photons to output lenses or observation plane.

Figure 18:
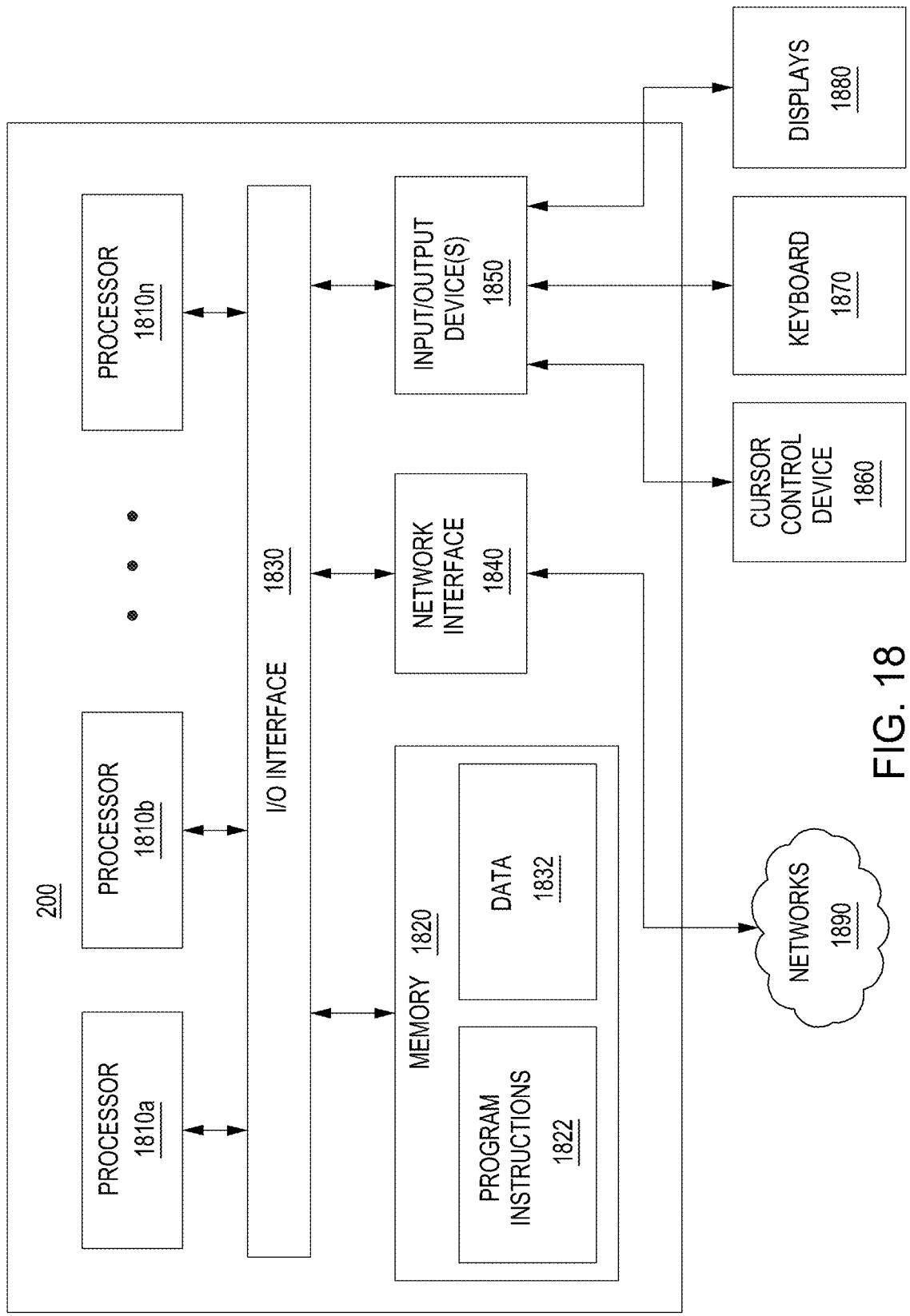
FIG. 18 depicts a high level block diagram of a system controller for implementing embodiments of a coherent beam combining system in accordance with embodiments of the present principles.

FIG. 18 depicts a high level block diagram of a system controller 48 for implementing embodiments of a coherent beam combining system in accordance with embodiments of the present principles. In some embodiments a system controller 48 can be configured to implement the method 600 as processor-executable program instructions 1822 (e.g., program instructions executable by processor(s) 1810) in various embodiments.

In the embodiment of FIG. 18, the system controller 48 includes one or more processors 1810a-1810n coupled to a system memory 1820 via an input/output (I/O) interface 1830. The system controller 48 further includes a network interface 1840 coupled to I/O interface 1830, and one or more input/output devices 1850, such as cursor control device 1860, keyboard 1870, and display(s) 1880. In various embodiments, any of the components can be utilized by the system to receive user input described above. In various embodiments, a user interface can be generated and displayed on display 1880. In some cases, it is contemplated that embodiments can be implemented using a single instance of the system controller 48, while in other embodiments multiple such systems, or multiple nodes making up the system controller 48, can be configured to host different portions or instances of various embodiments. For example, in one embodiment some elements can be implemented via one or more nodes of the system controller 48 that are distinct from those nodes implementing other elements. In another example, multiple nodes may implement the system controller 48 in a distributed manner.

In different embodiments, the system controller 48 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the system controller 48 can be a uniprocessor system including one processor 1810, or a multiprocessor system including several processors 1810 (e.g., two, four, eight, or another suitable number). Processors 1810 can be any suitable processor capable of executing instructions. For example, in various embodiments, processors 1810 may be general-purpose or embedded processors implementing any of a variety of instruction set architectures (ISAs). In multiprocessor systems, each of processors 1810 may commonly, but not necessarily, implement the same ISA.

System memory 1820 may be configured to store program instructions 1822 and/or data 1832 accessible by processor 1810. In various embodiments, system memory 1820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1820. In other embodiments, program instructions and/or data can be received, sent or stored upon different types of computer-accessible media or on similar media separate from system memory 1820 or the system controller 48.

In one embodiment, I/O interface 1830 can be configured to coordinate I/O traffic between processor 1810, system memory 1820, and any peripheral devices in the device, including network interface 1840 or other peripheral interfaces, such as input/output devices 1850. In some embodiments, I/O interface 1830 can perform any necessary protocol, timing or other data transformations to convert data signals from one component (e.g., system memory 1820) into a format suitable for use by another component (e.g., processor 1810). In some embodiments, I/O interface 1830 can include support for devices attached through various types of peripheral buses, such as a variant of the Peripheral Component Interconnect (PCI) bus standard or the Universal Serial Bus (USB) standard, for example. In some embodiments, the function of I/O interface 1830 can be split into two or more separate components, such as a north bridge and a south bridge, for example. Also, in some embodiments some or all of the functionality of I/O interface 1830, such as an interface to system memory 1820, can be incorporated directly into processor 1810.

Network interface 1840 can be configured to allow data to be exchanged between the system controller 48 and other devices attached to a network (e.g., network 1890), such as one or more external systems or between nodes of the system controller 48. In various embodiments, network 1890 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1840 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1850 can, in some embodiments, include one or more display terminals, keyboards, keypads, touchpads, scanning devices, voice or optical recognition devices, or any other devices suitable for entering or accessing data by one or more system controllers 48. Multiple input/output devices 1850 can be present in the system controller 48 or can be distributed on various nodes of the system controller 48. In some embodiments, similar input/output devices can be separate from the system controller 48 and can interact with one or more nodes of the system controller 48 through a wired or wireless connection, such as over network interface 1840.

In some embodiments, the illustrated the system controller 48 can implement any of the operations and methods described above, such as the methods illustrated by the flowchart of FIG. 6. In other embodiments, different elements and data can be included.

Those skilled in the art will appreciate that the system controller 48 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The system controller 48 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from system controller 48 can be transmitted to system controller 48 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

While the foregoing is directed to embodiments of the present principles, other and further embodiments may be devised without departing from the basic scope thereof. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

In the foregoing description, numerous specific details, examples, and scenarios are set forth in order to provide a more thorough understanding of the present principles. It will be appreciated, however, that embodiments of the principles can be practiced without such specific details. Further, such examples and scenarios are provided for illustration, and are not intended to limit the teachings in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Modules, data structures, blocks, and the like are referred to as such for case of discussion, and are not intended to imply that any specific implementation details are required. For example, any of the described modules and/or data structures may be combined or divided into sub-modules, sub-processes or other units of computer code or data as may be required by a particular design or implementation of the system controller 48.

The invention claimed is:

1. A high energy fiber laser system for coherent beam combining comprising:
   a signal source providing at least two single mode optical signals;
   a first sub-system, comprising;
      a first beam splitter splitting a signal received from the signal source into at least two fiber channels, wherein each of the at least two channels include;
      a first optical modulator broadening the linewidth of a respective, split optical signal;
      a second optical modulator locking the optical phases of optical signals received from a respective first optical modulator;
      an optical amplifier amplifying optical signals received from a respective second optical modulator;
      a fiber facet outputting optical signals received from a respective optical amplifier;
      output optics focusing optical signals received from the fiber facets to a focal plane to generate a reference interference pattern;
      an optical signal capture device capturing the intensity of a selected area of the reference interference pattern and converting the intensity into a metric; and
      a display device displaying at least the captured reference interference pattern;
   a second sub-system, comprising:
      a linewidth generator providing radio frequency broadening signals;
      a second splitter for splitting the radio frequency broadening signal into at least two channels of the second sub-system, wherein each of the at least two channels of the second sub-system include;
      a delay line;
   and
   a system controller, receiving signals from at least one of the optical signal capture device, and the display device, the system controller including a processor and a memory coupled to the processor, the memory having stored therein at least one of programs or instructions executable by the processor to configure the system controller to:
      evaluate the reference interference pattern using the signals received from at least one of the optical signal capture device and the display device;

maximize an intensity of the selected area of the reference interference pattern by causing a phase locking of optical signals in the at least two channels of the first sub-system using the second modulators in the at least two channels of the first sub-system;

increase a linewidth of the optical signals equally in the at least two channels of the first sub-system until the reference interference pattern is degraded by causing the application of a radio frequency broadening signal from the linewidth generator or from equal linewidth broadening generators to each of the second optical modulators in the at least two channels of the first sub-system while evaluating the reference interference pattern on the display device by using the signals received from the at least one of the optical signal capture device and the display device; and adjust a delay time of a respective delay line of one of the at least two channels of the first sub-system including the delay line of at least one split trigger signal until the reference interference pattern is recovered thereby providing a recovery of coherent combinability of the at least two split and amplified signals with a broadened linewidth at the output optics, by causing an adjustment of a value of a delay in one of the delay lines of the at least two channels of the second sub-system and causing the application of a resulting delay signal to a respective one of the modulators in the at least two channels of the first sub-system while evaluating the interference pattern by using the signals received from the at least one of the optical signal capture device and the display device.

2. The high energy fiber laser system of claim 1, wherein the system controller is further configured to:

increase a linewidth of the optical signals equally in the at least two channels of the first sub-system until the reference interference pattern is degraded due to loss of the coherent combinability by causing the application of an RF broadening signal from the linewidth generator to the first EO modulators in the at least two channels of the first sub-system or by causing the application of equal PRBS signals from equal pseudo-random bit sequence (PRBS) generators to the first EO modulators in the at least two channels of the first sub-system while evaluating the reference interference pattern on the display device; and adjust a delay time of the RF broadening signal in the at least one of the at least two channels of the first sub-system until the reference interference pattern is recovered, thereby providing a recovery of coherent combinability of the at least two split and amplified signals with a broadened linewidth at the output optics, by causing the application of a resulting delayed RF broadening signal to a respective one of the first EO modulators in the at least two channels of the first sub-system or by causing an application of a resulting delayed trigger signal to a respective equal PRBS generator providing a respective equal PRBS broadening signal to a respective one of the first EO modulators while evaluating the interference pattern by using the signals received from the at least one of the optical signal capture device and the display device.

3. The high energy fiber laser system of claim 2, wherein the system controller is configured to repeat the increase and adjust for each channel of the first sub-system.

4. The high energy fiber laser system of claim 1, wherein the system controller is configured to:

select one of the at least two channels of the first sub-system as a reference channel such that a respective delay time of a delay line of the reference channel is not adjusted.

5. The high energy fiber laser system of claim 4, wherein the system controller is configured to:

cause the adjustment of a value of a resulting delay signal used to recover the interference pattern such that a time of an optical signal in a respective one of the at least two channels of the first sub-system is located in the respective one of the at least two channels of the first sub-system at a point between an optical signal in the reference channel and an optical signal in one of the at least two channels of the first sub-system not being adjusted.

6. The high energy fiber laser system of claim 1, wherein the linewidth generator comprises at least one of a white noise signal generator, a chirped frequency signal generator, and a pseudo random binary sequence (PRBS) signal generator.

7. The high energy fiber laser system of claim 1, further comprising a third beam splitter splitting the focused optical signals from the output optics into two optical paths, wherein the split optical signal in one of the optical paths is received by a photo-sensor for measuring an intensity of the selected area of the split optical signal, and the optical signal in the other one of the optical paths is received by the optical signal capture device.

8. The high energy fiber laser system of claim 1, wherein the output optics comprise a collimating lens in each of the at least two channels of the first sub-system and a focusing lens common to all of the at least two channels of the first sub-system.

9. The high energy fiber laser system of claim 8, wherein the focusing lens comprises a Fourier lens.

10. The high energy fiber laser system of claim 1, wherein the signal source comprises a plurality of fiber laser collimators arranged as a fiber array.

11. The high energy fiber laser system of claim 1, wherein the signal source comprises a plurality of fiber channels and the method of the system controller is repeated for groups of neighboring ones of the plurality of fiber channels, wherein an optical signal is carried only by fiber channels in a group of fiber channels to generate a respective reference interference pattern representative of the group of fiber channels of the plurality of fiber channels.

12. The high energy fiber laser system of claim 1, wherein each of the at least two channels of the first sub-system further include a respective actuator for controlling a position of the fiber facet and wherein the system controller is further configure to:

maximize an intensity of the selected area of the captured, reference interference pattern by causing the adjustment of a position of at least one of the fiber facets in the at least two channels of the first sub-system using the respective actuator.

* * * * *